(12) United States Patent
Pazos et al.

(10) Patent No.: US 10,182,330 B2
(45) Date of Patent: Jan. 15, 2019

(54) EMERGENCY ALERT USING MBMS AND CELL BROADCASTING

(71) Applicant: QUALCOMM Incorporated, San Diego, CA (US)

(72) Inventors: Carlos Marcelo Dias Pazos, San Diego, CA (US); Xiaoxia Zhang, San Diego, CA (US); Chaitali Gupta, San Diego, CA (US); Jun Wang, San Diego, CA (US); Nagaraju Naik, San Diego, CA (US); Ralph A. Gholmieh, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 103 days.

(21) Appl. No.: 14/075,916

(22) Filed: Nov. 8, 2013

(65) Prior Publication Data

US 2014/0134970 A1 May 15, 2014

Related U.S. Application Data

(60) Provisional application No. 61/725,911, filed on Nov. 13, 2012.

(51) Int. Cl.
*H04W 76/40* (2018.01)
*H04W 4/90* (2018.01)
(Continued)

(52) U.S. Cl.
CPC ........... *H04W 4/90* (2018.02); *H04L 65/4069* (2013.01); *H04M 3/00* (2013.01); *H04W 72/005* (2013.01);
(Continued)

(58) Field of Classification Search
CPC ..... H04W 48/20; H04W 4/22; H04W 76/007; H04W 76/40; H04W 4/90; H04W 4/06;
(Continued)

(56) References Cited

U.S. PATENT DOCUMENTS

2004/0103158 A1 5/2004 Vella et al.
2008/0261554 A1* 10/2008 Keller et al. ............... 455/404.1
(Continued)

FOREIGN PATENT DOCUMENTS

WO WO-2006066629 A1 6/2006
WO WO-2009053111 A1 4/2009

OTHER PUBLICATIONS

"3rd Generation Partnership Project; Technical Specification Group Services and System Aspects; Earthquake and Tsunami Warning System (ETWS) Requirements and Solutions; Solution Placeholder (Release 8)" 3GPP Standard; 3GPP TR 23.828, 3rd Generation Partnership Project (3GPP), Mobile Competence Centre; 650, Route Des Lucioles; F-06921 Sophia-Antipolis Cedex; France, No. V8.0. 0, Sep. 1, 2008 (Sep. 1, 2008), pp. 1-22, XP050363891 paragraphs [04.2], [006].

(Continued)

*Primary Examiner* — Lester G Kincaid
*Assistant Examiner* — Dung L Lam
(74) *Attorney, Agent, or Firm* — Qualcomm Incorporated

(57) ABSTRACT

An emergency notification service is described that is delivered using an evolved multimedia broadcast-multicast service (eMBMS). An emergency notification is sent out to user equipment (UE) in affected areas. In response to receiving the emergency notification, the UE searches the appropriate emergency multicast service acquisition information for multiple potential types of available emergency content that is provided by the eMBMS system in the network and tunes to the eMBMS to receive the emergency content. In selected
(Continued)

aspects, the transmitted information, including the notifications and content may be scrambled using the same cell ID for each of the cells transmitting the same content. This improves the quality of the transmitted signals allowing for more reliable receipt and decoding by the receiving UEs.

24 Claims, 13 Drawing Sheets

(51) Int. Cl.
  *H04L 29/06*  (2006.01)
  *H04M 3/00*  (2006.01)
  *H04W 72/00*  (2009.01)
  *H04W 76/50*  (2018.01)
  *H04W 4/06*  (2009.01)
  *H04M 3/51*  (2006.01)

(52) U.S. Cl.
  CPC ........... *H04W 76/40* (2018.02); *H04W 76/50* (2018.02); *H04M 3/5116* (2013.01); *H04W 4/06* (2013.01)

(58) Field of Classification Search
  CPC . H04L 12/189; H04L 65/4076; H04M 3/5116
  See application file for complete search history.

(56) References Cited

U.S. PATENT DOCUMENTS

| | | |
|---|---|---|
| 2010/0034141 A1 | 2/2010 | Meylan |
| 2010/0302988 A1* | 12/2010 | Becker ................ H04L 12/1877 370/312 |
| 2012/0202493 A1 | 8/2012 | Wang et al. |
| 2012/0213130 A1* | 8/2012 | Zhang et al. ................ 370/280 |

OTHER PUBLICATIONS

International Search Report and Written Opinion—PCT/US2013/069413—ISA/EPO—dated Feb. 11, 2014.

Nokia Siemens Networks (Rapporteur): "SIB for ETWS", 3GPP Draft; 36300 CR0037-(REL-8) R2-086069, 3rd Generation Partnership Project (3GPP), Mobile Competence Centre; 650, Route Des Lucioles; F-06921 Sophia-Antipolis Cedex; France, No. Prague, Czech Republic; Oct. 22, 2008, Oct. 22, 2008 (Oct. 22, 2008), pp. 1-5, XP050320924, [retrieved on Oct. 22, 2008] the whole document.

Qualcomm Incorporated et al., "New WID on Study on MBMS for Emergency Services (FS_MES)", 3GPP Draft; S1-134065 MFP, 3rd Generation Partnership Project (3GPP), Mobile Competence Centre; 650, Route Des Lucioles; F-06921 Sophia-Antipolis Cedex; France vol. SA WG1, No. Zagreb, Croatia; Aug. 19, 2013-Aug. 23, 2013 Aug. 26, 2013 (Aug. 26, 2013), pp. 1-5, XP050725135, Retrieved from the Internet: URL: http://www.3gpp.org/ftp/tsg_sa/WG1_Serv/TSGS1_63_Zagreb/docs/ [retrieved on Aug. 26, 2013] the whole document.

3GPP TS 23.041 V12.0.0 (Dec. 2012), 3rd Generation Partnership Project; Technical Specification Group Core Network and Terminals; Technical realization of Cell Broadcast Service (CBS) (Release 12), 64 pp.

Qualcomm Research, "LTE Embms Technology Overview," Nov. 2012, 18 pages.

* cited by examiner

EMERGENCY ALERT USING MBMS AND CELL BROADCASTING

CROSS-REFERENCE TO RELATED APPLICATIONS

This application claims the benefit of U.S. Provisional Patent Application No. 61/725,911, entitled, "EMERGENCY ALERT USING MBMS AND CELL BROADCASTING", filed on Nov. 13, 2012, which is expressly incorporated by reference herein in its entirety.

BACKGROUND

Field

Aspects of the present disclosure relate generally to wireless communication systems, and more particularly, to emergency alert using Multimedia Broadcast Multicast Service (MBMS) and cell broadcasting.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs), also referred to as mobile entities. A UE may communicate with a base station via a downlink and an uplink. The downlink (or forward link) refers to the communication link from the base station to the UE, and the uplink (or reverse link) refers to the communication link from the UE to the base station. As used herein, a "base station" means an eNode B (eNB), a Node B, a Home Node B, or similar network component of a wireless communications system.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast operation, each eNB is controlled so as to transmit signals carrying information directed to one or more particular subscriber UEs. The specificity of unicast signaling enables person-to-person services such as, for example, voice calling, text messaging, or video calling.

Recent LTE versions support enhanced MBMS (eMBMS) in the LTE air interface to provide the video streaming and file download broadcast delivery. For example, video streaming service is expected to be transported by the DASH (Dynamic Adaptive Streaming using HTTP) protocol over FLUTE (File Delivery over Unidirectional Transport) as defined in IETF RFC 3926 over UDP/IP packets. File download service is transported by FLUTE over UDP/IP protocols. Both high layers over IP are processed by the LTE broadcast channels in PHY and L2 (including MAC and RLC layers).

With the availability of mobile devices configured for wireless communications, emergency notification services have been adapted to provide alerts to a wide range of people having access to such mobile devices in the areas affected by a particular emergency. Current emergency notification services use textual descriptions of emergency events typically transmitted over a unicast channel, such as the physical download shared channel (PDSCH). However, the data rates of such unicast transmissions as well as the susceptibility to interference impacts the amount of information that can be transmitted as well as the reliability of the underlying transmissions.

SUMMARY

Various aspects of the present disclosure are directed to a method for wireless communication that includes receiving, at a UE, an emergency notification, discovering, by the UE, emergency multicast service acquisition information for one or more types of emergency content, wherein the discovering is in response to the emergency notification, and tuning, by the UE, to an evolved multimedia broadcast-multicast service (eMBMS) providing emergency content associated with the emergency notification, wherein the UE tunes to the eMBMS using the emergency multicast service acquisition information.

Additional aspects of the present disclosure are directed to a method for wireless communication that includes receiving, at a network broadcast entity, emergency content from an emergency authority, signaling, from the network broadcast entity, an emergency notification, in response to receiving the emergency content, providing, by the network broadcast entity, emergency multicast service acquisition information associated with the emergency notification for one or more types of emergency content available related to the emergency notification, and transmitting, by the network broadcast entity, an eMBMS with the one or more types of emergency content available related to the emergency notification, wherein the emergency multicast service acquisition information identifies the eMBMS.

Further aspects of the present disclosure are directed to a method for wireless communication that includes receiving, at a first cell, a cell identifier (ID) for application to broadcast service content commonly transmitted by one or more other cells, scrambling the broadcast service content using the cell ID, wherein the cell ID is the same for the one or more other cells commonly transmitting the broadcast service content, and transmitting the scrambled broadcast service content.

Further aspects of the present disclosure are directed to an apparatus configured for wireless communication that includes means for receiving, at a UE, an emergency notification, means for discovering, by the UE, emergency multicast service acquisition information for one or more types of emergency content, wherein the means for discovering is triggered in response to the emergency notification, and means for tuning, by the UE, to an eMBMS providing emergency content associated with the emergency notification, wherein the UE tunes to the eMBMS using the emergency multicast service acquisition information.

Further aspects of the present disclosure are directed to an apparatus configured for wireless communication that includes means for receiving, at a network broadcast entity, emergency content from an emergency authority, means, executed in response to receiving the emergency content, for signaling, from the network broadcast entity, an emergency notification, means for providing, by the network broadcast entity, emergency multicast service acquisition information associated with the emergency notification for one or more types of emergency content available related to the emergency notification, and means for transmitting, by the network broadcast entity, an eMBMS with the one or more types of emergency content available related to the emergency notification, wherein the emergency multicast service acquisition information identifies the eMBMS.

Further aspects of the present disclosure are directed to an apparatus configured for wireless communication that includes means for receiving, at a first cell, a cell ID for application to broadcast service content commonly transmitted by one or more other cells, means for scrambling the broadcast service content using the cell ID, wherein the cell ID is the same for the one or more other cells commonly transmitting the broadcast service content, and means for transmitting the scrambled broadcast service content.

Further aspects of the present disclosure are directed to a non-transitory computer-readable medium having program code stored thereon. The program code, when executed by a computer, causes the computer to receive, at a UE, an emergency notification, discover, by the UE, emergency multicast service acquisition information for one or more types of emergency content, wherein the program code to discover is executed in response to the emergency notification, and tune, by the UE, to an eMBMS providing emergency content associated with the emergency notification, wherein the UE tunes to the eMBMS using the emergency multicast service acquisition information.

Further aspects of the present disclosure are directed to a non-transitory computer-readable medium having program code stored thereon. The program code, when executed by a computer, causes the computer to receive, at a network broadcast entity, emergency content from an emergency authority, signal, from the network broadcast entity, an emergency notification in response to receiving the emergency content, provide, by the network broadcast entity, emergency multicast service acquisition information associated with the emergency notification for one or more types of emergency content available related to the emergency notification, and transmit, by the network broadcast entity, an eMBMS with the one or more types of emergency content available related to the emergency notification, wherein the emergency multicast service acquisition information identifies the eMBMS.

Further aspects of the present disclosure are directed to a non-transitory computer-readable medium having program code stored thereon. The program code, when executed by a computer, causes the computer to receive, at a first cell, a cell ID for application to broadcast service content commonly transmitted by one or more other cells, scramble the broadcast service content using the cell ID, wherein the cell ID is the same for the one or more other cells commonly transmitting the broadcast service content, and transmit the scrambled broadcast service content.

Further aspects of the present disclosure are directed to an apparatus configured for wireless communication. The apparatus includes at least one processor and a memory coupled to the at least one processor. The processor is configured to receive, at a UE, an emergency notification, discover, by the UE, emergency multicast service acquisition information for one or more types of emergency content, wherein configuration of the at least one processor to discover is triggered in response to the emergency notification, and tune, by the UE, to an eMBMS providing emergency content associated with the emergency notification, wherein the UE tunes to the eMBMS using the emergency multicast service acquisition information.

Further aspects of the present disclosure are directed to an apparatus configured for wireless communication. The apparatus includes at least one processor and a memory coupled to the at least one processor. The processor is configured to receive, at a network broadcast entity, emergency content from an emergency authority, signal, from the network broadcast entity, an emergency notification in response to receiving the emergency content, provide, by the network broadcast entity, emergency multicast service acquisition information associated with the emergency notification for one or more types of emergency content available related to the emergency notification, and transmit, by the network broadcast entity, an eMBMS with the one or more types of emergency content available related to the emergency notification, wherein the emergency multicast service acquisition information identifies the eMBMS.

Further aspects of the present disclosure are directed to an apparatus configured for wireless communication. The apparatus includes at least one processor and a memory coupled to the at least one processor. The processor is configured to receive, at a first cell, a cell ID for application to broadcast service content commonly transmitted by one or more other cells, scramble the broadcast service content using the cell ID, wherein the cell ID is the same for the one or more other cells commonly transmitting the broadcast service content, and transmit the scrambled broadcast service content.

The foregoing has outlined rather broadly the features and technical advantages of the present application in order that the detailed description that follows may be better understood. Additional features and advantages will be described hereinafter which form the subject of the claims. It should be appreciated by those skilled in the art that the conception and specific aspect disclosed may be readily utilized as a basis for modifying or designing other structures for carrying out the same purposes of the present application. It should also be realized by those skilled in the art that such equivalent constructions do not depart from the spirit and scope of the present application and the appended claims. The novel features which are believed to be characteristic of aspects, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present claims.

BRIEF DESCRIPTION OF THE DRAWINGS

FIG. 14 is a functional block diagram illustrating example blocks executed to implement one aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
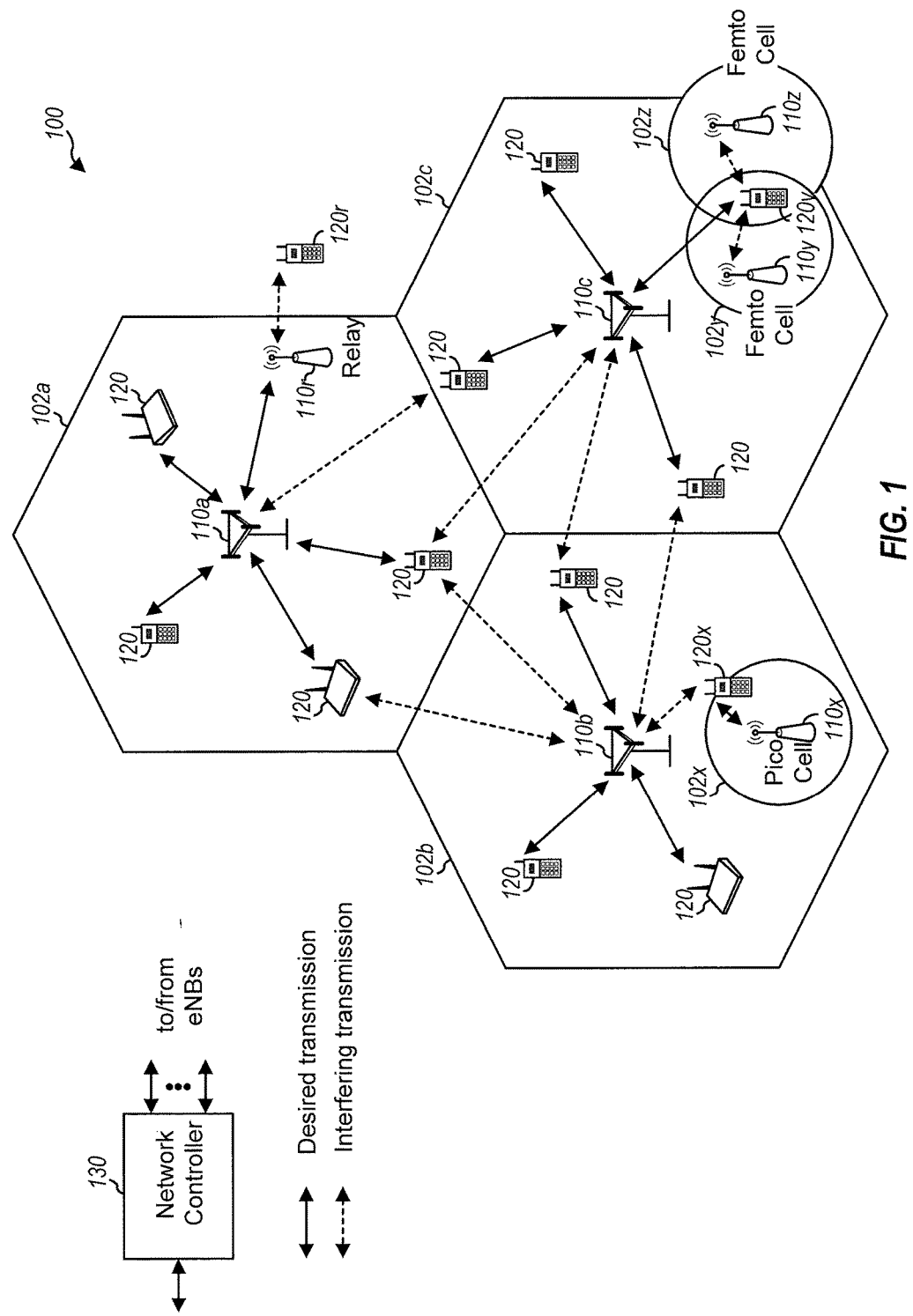
FIG. 1 is a block diagram illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
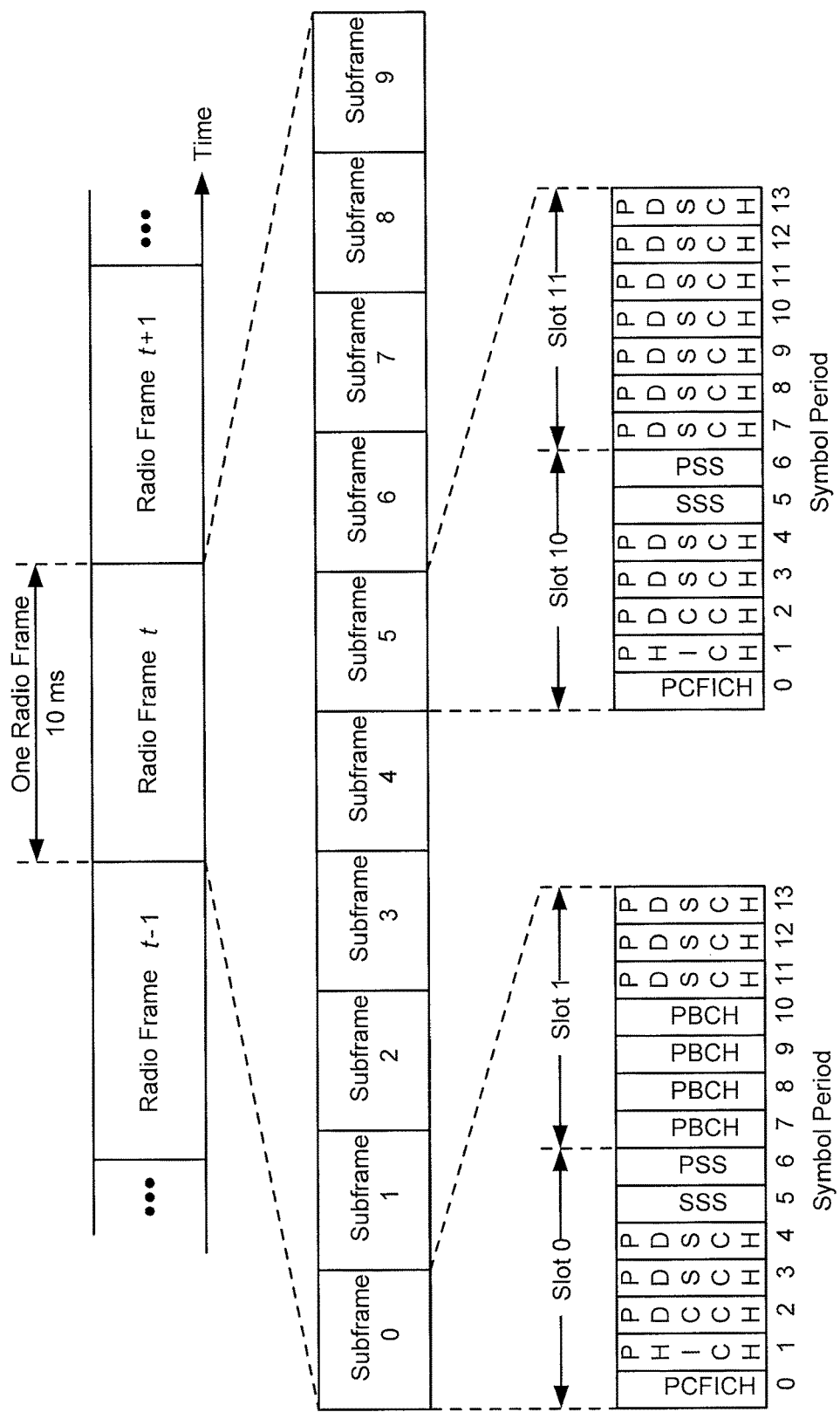
FIG. 2 is a block diagram illustrating an example of a down link frame structure in a telecommunications system.
Figure 6:
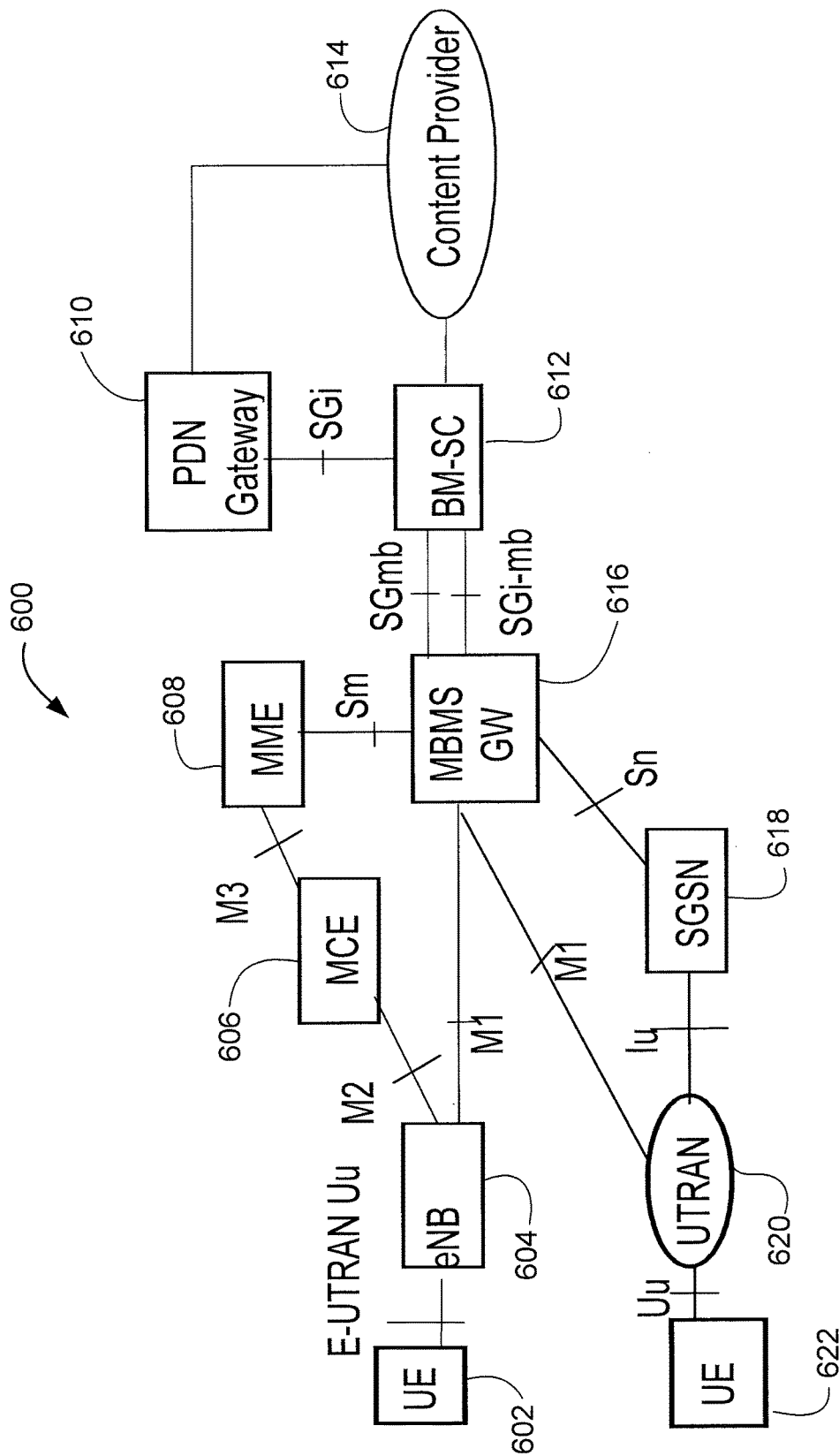
FIG. 6 is a block diagram illustrating components of a wireless communication system for providing or supporting MBSFN service.

FIG. 2 shows a down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
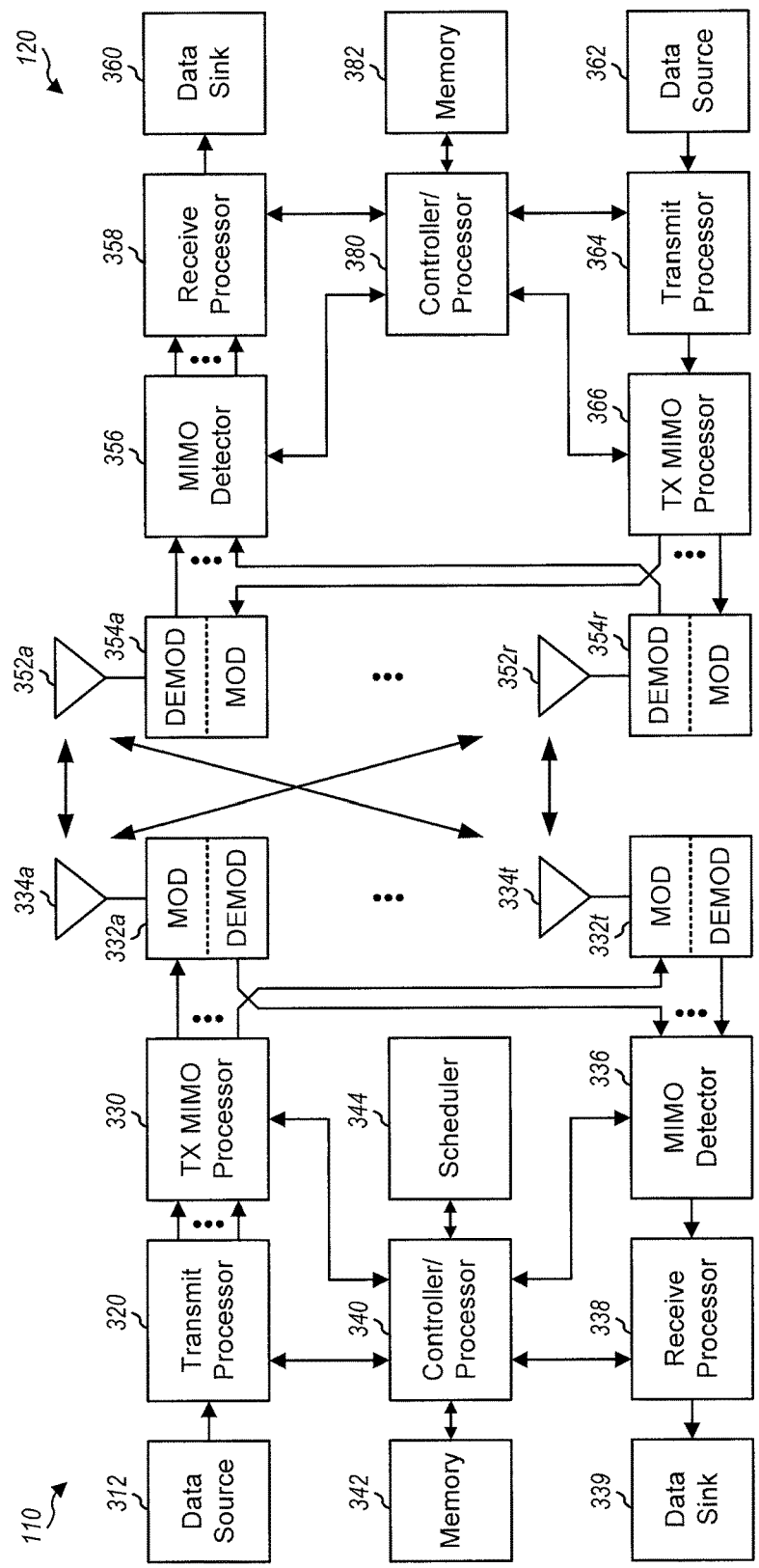
FIG. 3 is a block diagram illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

eMBMS and Unicast Signaling in Single Frequency Networks:

One technique to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit information in a synchronized manner, so that signals reinforce one another rather than interfere with each other. In the context of eMBMS, the shared content is transmitted from multiple eNB's of a LTE network to multiple UEs. Therefore, within a given eMBMS area, a UE may receive eMBMS signals from any eNB(s) within radio range as part of the eMBMS service area or MBSFN area which includes both eMBMS traffic and control channel (i.e., MTCH and MCCH). However, to decode the eMBMS control channel (MCCH), each UE receives System Information Blocks (SIBs) from a serving eNB over a non-eMBMS channel. MCCH information changes from time to time and notification of changes is provided through another non-eMBMS channel, the PDCCH. Therefore, to decode eMBMS signals within a particular eMBMS area, each UE is served SIBs and PDCCH signals by one of the eNBs in the area.

In accordance with aspects of the subject of this disclosure, there is provided a wireless network (e.g., a 3GPP network) having features relating to single carrier optimization for eMBMS. eMBMS provides an efficient way to transmit shared content from an LTE network to multiple mobile entities, such as, for example, UEs.

With respect a physical layer (PHY) of eMBMS for LTE Frequency Division Duplex (FDD), the channel structure may comprise time division multiplexing (TDM) resource partitioning between eMBMS and unicast transmissions on mixed carriers, thereby allowing flexible and dynamic spectrum utilization. Currently, a subset of subframes (up to 60%), known as multimedia broadcast single frequency network (MBSFN) subframes, can be reserved for eMBMS transmission. As such current eMBMS design allows at most six out of ten subframes for eMBMS.

Figure 4:
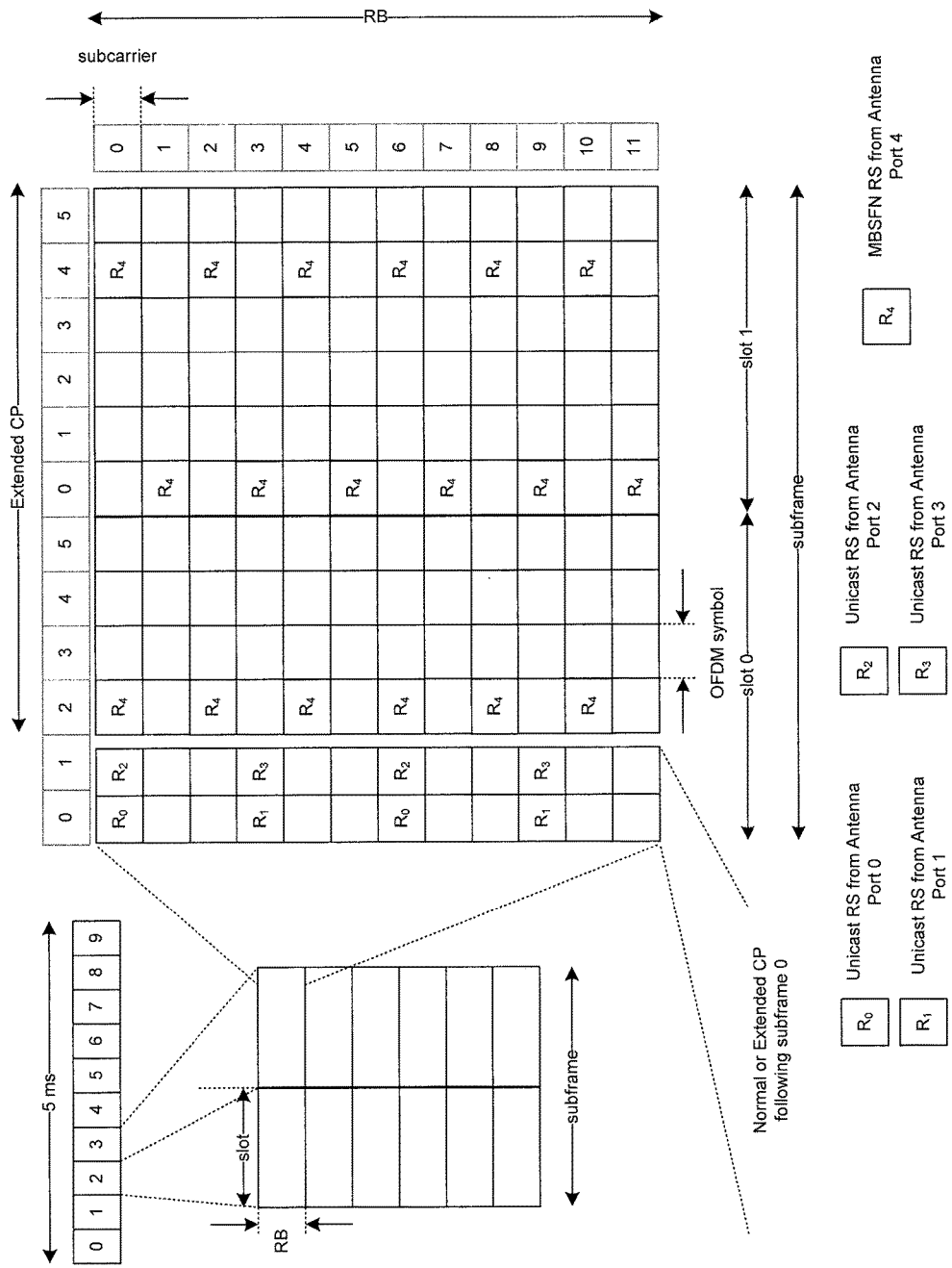
FIG. 4 is a diagram of a signaling frame illustrating an example of symbol allocation for unicast and multicast signals.

An example of subframe allocation for eMBMS is shown in FIG. 4, which shows an existing allocation of MBSFN reference signals on MBSFN subframes, for a single-carrier case. Components depicted in FIG. 4 correspond to those shown in FIG. 2, with FIG. 4 showing the individual subcarriers within each slot and resource block (RB). In 3GPP LTE, an RB spans 12 subcarriers over a slot duration of 0.5 ms, with each subcarrier having a bandwidth of 15 kHz together spanning 180 kHz per RB. Subframes may be allocated for unicast or eMBMS; for example in a sequence of subframes labeled 0, 1, 2, 3, 4, 5, 6, 7, 8, and 9, subframes 0, 4, 5, and 9 may be excluded from eMBMS in FDD. Also, subframes 0, 1, 5, and 6 may be excluded from eMBMS in time division duplex (TDD). More specifically, subframes 0, 4, 5, and 9 may be used for PSS/SSS/PBCH/paging/system information blocks (SIBs) and unicast service. Remaining subframes in the sequence, e.g., subframes 1, 2, 3, 6, 7, and 8 may be configured as eMBMS subframes.

Figure 5:
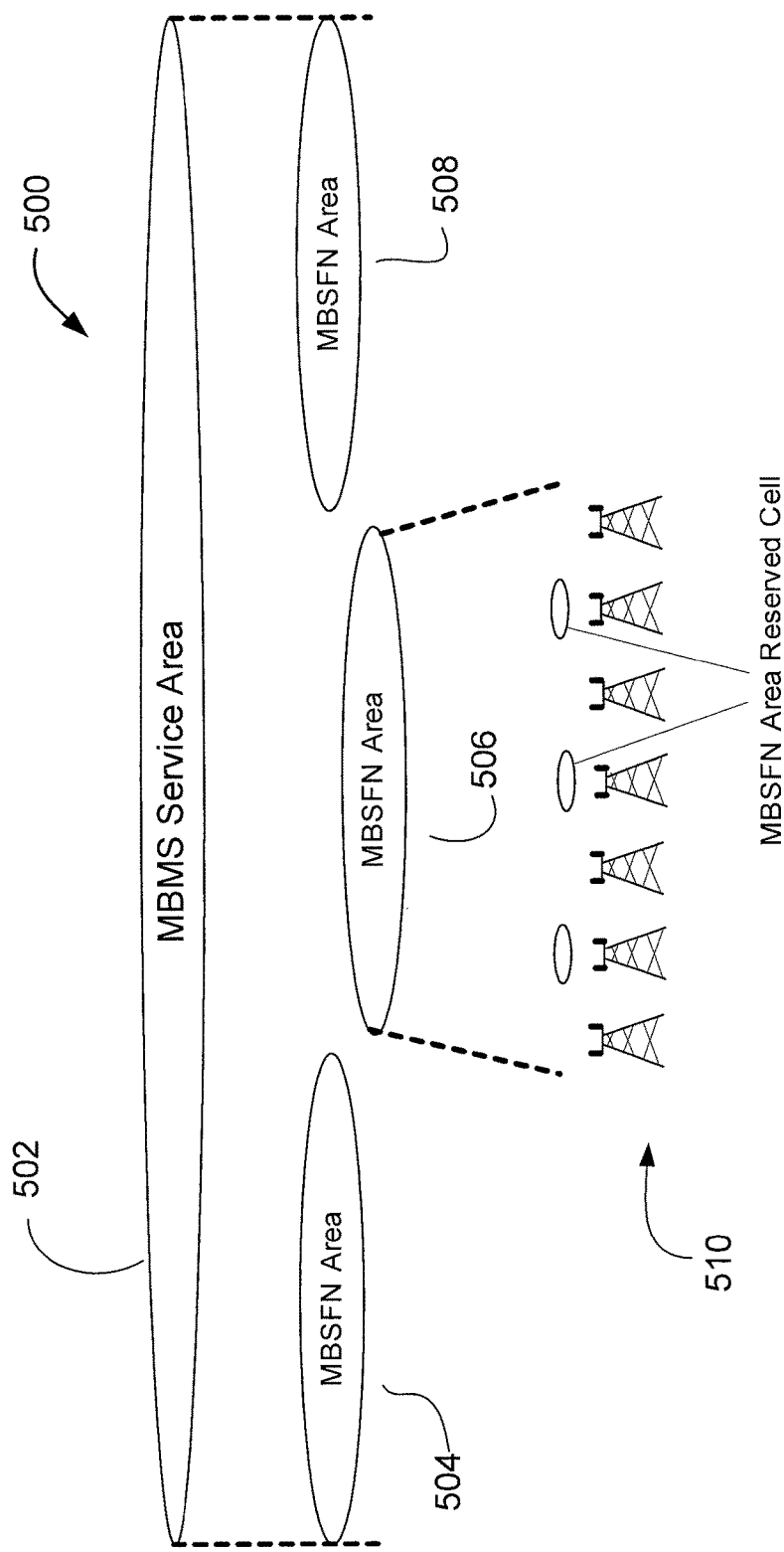
FIG. 5 is a diagram illustrating MBMS over a Single Frequency Network (MBSFN) areas within an MBSFN service area.

With continued reference to FIG. 4, within each eMBMS subframe, the first 1 or 2 symbols may be used for unicast reference symbols (RSs) and control signaling. A CP length of the first 1 or 2 symbols may follow that of subframe 0. A transmission gap may occur between the first 1 or 2 symbols and the eMBMS symbols if the CP lengths are different. In related aspects, the overall eMBMS bandwidth utilization may be 42.5% considering RS overhead (e.g., 6 eMBMS subframes and 2 control symbols within each eMBMS subframe). Known techniques for providing MBSFN RSs and unicast RSs typically involve allocating the MBSFN RSs on MBSFN subframes (as shown in FIG. 4), and separately allocating unicast RSs on non-MBSFN subframes. More specifically, as FIG. 4 shows, the extended CP of the MBSFN subframe includes MBSFN RSs but not unicast RSs. The present technology is not limited to the particular frame allocation scheme illustrated by FIGS. 2 and 4, which are presented by way of example, and not by way of limitation. A multicast session or multicast broadcast as used herein may use any suitable frame allocation scheme.

eMBMS Service Areas:

FIG. 5 illustrates a system 500 including an MBMS service area 502 encompassing multiple MBSFN areas 504, 506, 508, which themselves include multiple cells or base stations 510. As used herein, an "MBMS service area" refers to a group of wireless transmission cells where a certain MBMS service is available. For example, a particular sports or other program may be broadcast by base stations within the MBMS service area at a particular time. The area where the particular program is broadcast defines the MBMS service area. The MBMS service area may be made up of one or more "MBSFN areas" as shown at 504, 506 and 508. As used herein, an MBSFN area refers to a group of cells (e.g., cells 510) currently broadcasting a particular program in a synchronized fashion using an MBSFN protocol. An "MBSFN synchronization area" refers to a group of cells that are interconnected and configured in a way such that they are capable of operating in a synchronized fashion to broadcast a particular program using an MBSFN protocol, regardless of whether or not they are currently doing so. Each eNB can belong to only one MBSFN synchronization area, on a given frequency layer. It is worth noting that an MBMS service area 502 may include one or more MBSFN synchronization areas (not shown). Conversely, an MBSFN synchronization area may include one or more MBSFN areas or MBMS service areas. Generally, an MBSFN area is made up of all, or a portion of, a single MBSFN synchronization area and is located within a single MBMS service area. Overlap between various MBSFN areas is supported, and a single eNB may belong to several different MBSFN areas. For example, up to 8 independent MCCHs may be configured in System Information Block (SIB) 13 to support membership in different MBSFN areas. An MBSFN Area Reserved Cell or Base Station is a cell/base station within a MBSFN Area that does not contribute to the MBSFN transmission, for example a cell near a MBSFN Synchronization Area boundary, or a cell that that is not needed for MBSFN transmission because of its location.

eMBMS System Components and Functions:

FIG. 6 illustrates functional entities of a wireless communication system 600 for providing or supporting MBSFN service. Regarding Quality of Service (QoS), the system 600 uses a Guaranteed Bit Rate (GBR) type MBMS bearer, wherein the Maximum Bit Rate (MBR) equals the GBR. These components are shown and described by way of example, and do not limit the inventive concepts described herein, which may be adopted to other architectures and functional distributions for delivering and controlling multicast transmissions.

The system 600 may include an MBMS Gate Way (MBMS GW) 616. The MBMS GW 616 controls Internet Protocol (IP) multicast distribution of MBMS user plane data to eNodeBs 604 via an M1 interface; one eNB 604 of many possible eNBs is shown. In addition, the MBMS GW controls IP multicast distribution of MBMS user plane data to UTRAN Radio Network Controllers (RNCs) 620 via an M1 interface; one UTRAN RNC 620 of many possible RNCs is shown. The M1 interface is associated to MBMS data (user plane) and makes use of IP for delivery of data packets. The eNB 604 may provide MBMS content to a user equipment (UE)/mobile entity 602 via an E-UTRAN Uu interface. The RNC 620 may provide MBMS content to a UE mobile entity 622 via a Uu interface. The MBMS GW 616 may further perform MBMS Session Control Signaling, for example MBMS session start and session stop, via the Mobility Management Entity (MME) 608 and Sm interface. The MBMS GW 616 may further provide an interface for entities using MBMS bearers through the SG-mb (user plane) reference point, and provide an interface for entities using MBMS bearers through the SGi-mb (control plane) reference point. The SG-mb Interface carries MBMS bearer service specific signaling. The SGi-mb interface is a user plane interface for MBMS data delivery. MBMS data delivery may be performed by IP unicast transmission, which may be a default mode, or by IP multicasting. The MBMS GW 616 may provide a control plane function for MBMS over UTRAN via a Serving General Packet Radio Service Support Node (SGSN) 618 and the Sn/Iu interfaces.

The system 600 may further include a Multicast Coordinating Entity (MCE) 606. The MCE 606 may perform an admission control function form MBMS content, and allocate time and frequency radio resources used by all eNBs in the MBSFN area for multi-cell MBMS transmissions using MBSFN operation. The MCE 606 may determine a radio configuration for an MBSFN Area, such as, for example, the modulation and coding scheme. The MCE 606 may schedule and control user plane transmission of MBMS content, and manage eMBMS service multiplexing, by determining which services are to be multiplexed in which Multicast Channel (MCH). The MCE 606 may participate in MBMS Session Control Signaling with the MME 608 through an M3 interface, and may provide a control plane interface M2 with the eNB 604.

The system 600 may further include a Broadcast-Multicast Service Center (BM-SC) 612 in communication with a content provider server 614. The BM-SC 616 may handle intake of multicast content from one or more sources such as the content provider 614, and provide other higher-level management functions as described below. These functions may include, for example, a membership function, including authorization and initiation of MBMS services for an identified UE. The BM-SC 616 may further perform MBMS session and transmission functions, scheduling of live broadcasts, and delivery, including MBMS and associated delivery functions. The BM-SC 616 may further provide service advertisement and description, such as advertising content available for multicast. A separate Packet Data Protocol (PDP) context may be used to carry control messages between UE and BM-SC. The BM-SC may further provide security functions such as key management, manage charging of content providers according to parameters such as data volume and QoS, provide content synchronization for MBMS in UTRAN and in E-UTRAN for broadcast mode, and provide header compression for MBSFN data in UTRAN. The BM-SC 612 may indicate session start, update and stop to the MBMS-GW 616 including session attributes such as QoS and MBMS service area.

The system 600 may further include a Multicast Management Entity (MME) 608 in communication with the MCE 606 and MBMS-GW 608. The MME 600 may provide a control plane function for MBMS over E-UTRAN. In addition, the MME may provide the eNB 604, 620 with multicast related information defined by the MBMS-GW 616. An Sm interface between the MME 608 and the MBMS-GW 616 may be used to carry MBMS control signaling, for example, session start and stop signals.

The system 600 may further include a Packet Data Network (PDN) Gate Way (GW) 610, sometimes abbreviated as a P-GW. The P-GW 610 may provide an Evolved Packet System (EPS) bearer between the UE 602 and BM-SC 612 for signaling and/or user data. As such, the P-GW may receive Uniform Resource Locator (URL) based requests originating from UEs in association with IP addresses assigned to the UEs. The BM-SC 612 may also be linked to one or more content providers via the P-GW 610, which may communicate with the BM-SC 612 via an IP interface.

LTE supports Emergency Alert Service using cell broadcasting. Current System Information Blocks (SIBs) defined in radio access network (RAN) can support emergency alert through PWS (Public Warning System). There are currently two categories of emergency alert services: Earthquake and Tsunami Warning System (ETWS), which provides notifications of natural disasters, such as earthquakes and tsunamis, and Commercial Mobile Alert System (CMAS), designated for presidential, imminent threat, and child abduction emergency alerts. One goal of these Emergency Alert Services is to send emergency alert notifications to as many devices as possible at the earliest time possible in a reliable way.

The Emergency Alert Service in LTE provides a page that informs a UE within range of the base station of the emergency notification. A UE may read the paging while in idle state. Additionally, ETWS and/or CMAS-capable UEs may also read the paging in a connected state, such as RRC_CONNECTED, to check whether ETWS and/or CMAS notification is present or not. Such an ETWS/CMAS-capable UE would read the paging at least once every default paging cycle. The paging message includes an indication, whether an ETWS-Indication or a CMAS-Indication. The emergency notifications are provided in System Information Blocks (SIBs). SIB10 and SIB11 are assigned to ETWS, in which SIB10 contains the primary ETWS notification and SIB11 contains the secondary notification. CMAS notifications are contained in SIB12. In the event of an emergency, SIB1 carries the scheduling information for SIB10/11 (for ETWS) or SIB12 (for CMAS).

The emergency notification system begins with authorized emergency notification bodies that initiate a notification upon detection of an emergency. The emergency notification is provided into the cell broadcast system at a cell broadcast entity (CBE) and cell broadcast center (CBC). The notification is propagated into the LTE network through a CBC connection to a mobility management entity (MME). In an LTE network, the eNBs are grouped into target areas (identified by a target area identifier (TAID)), or logical emergency affected area (identified by emergency area identifier (EAID)). When the emergency notification is received at the MME, the MME broadcasts the emergency notifications to the eNBs included in the affected areas (TAIDs/EAIDs). The eNBs in affected areas then signal the emergency notifications to UEs in those areas. The eNB sends a paging message to notify the UEs of the emergency information (e.g., SIB changes). The UEs in idle or connected mode receive paging message during the paging monitoring periods. For example, a SIB-1 is sent periodically every 80-ms and provides schedule information for SIB-10, SIB-11 (for ETWS) and SIB-12 (for CMAS). The UEs would then use the schedule information to access the appropriate SIBs.

Current emergency notification services in LTE provide textual description of emergency events. Because the notifications defined in the SIBs are sent over a unicast channel (e.g., PDSCH), they tend to suffer from neighbor cell interference. To ensure that majority of users can receive such notification, the data rates over SIBs are rather limited. SIBs are sufficient for notification and small text data, but is not capable of carrying rich media or larger amounts of data (for example, maps for evacuations in emergency case, or graphic of warned area).

Various aspects of the present disclosure propose use of eMBMS to deliver enhanced emergency content via broadcast benefiting from MBSFN gain. Use of eMBMS takes advantage of more bandwidth to deliver rich media content. MBSFN transmission also experiences significantly reduced downlink interference compared to the unicast transmission of SIBs. Moreover, higher receive SNR with MBSFN allows for rich media content sent to majority of UEs. With the increased bandwidth, eMBMS transmissions may include images, additional text, news or emergency agency audio/video clips, emergency metadata (e.g., EPG for emergency eMBMS services), and the like. Moreover, with increased bandwidth, eMBMS transmissions may provide emergency related streaming content, which may include live coverage of affected areas.

Figure 7:
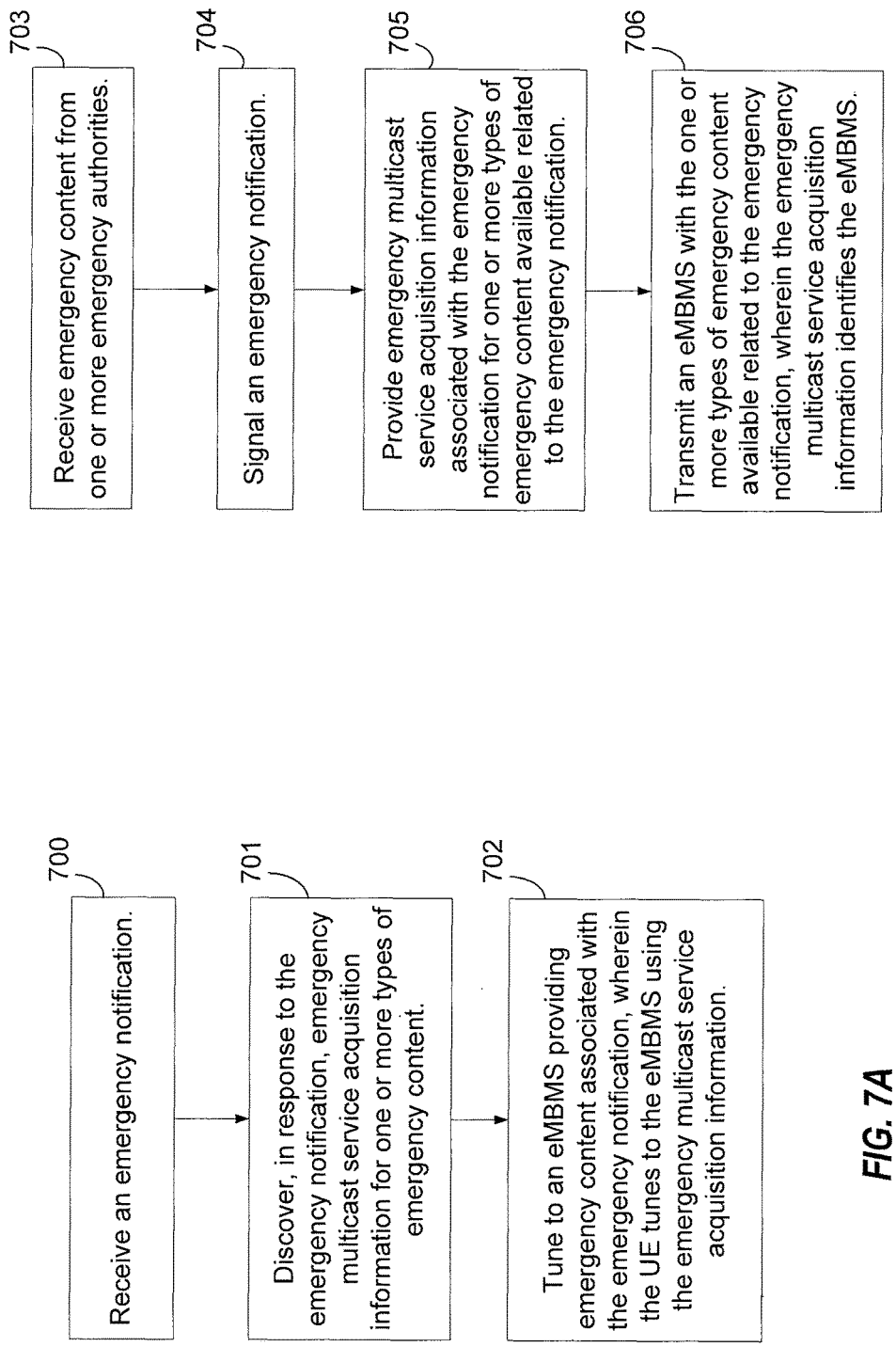
FIG. 7A is a functional block diagram illustrating example blocks executed to implement one aspect of the present disclosure.
FIG. 7B is a functional block diagram illustrating example blocks executed to implement one aspect of the present disclosure.

FIG. 7A is a functional block diagram illustrating example blocks executed to implement one aspect of the present disclosure. At block 700, a UE receives an emergency notification. The emergency notification provides an indication to the UE that emergency content is available through a broadcast-multicast emergency service. For example, with reference to UE 120 of FIG. 3, signals are received via antennas 352a-r, demodulator/modulators 354a-r, MIMO detector 356, and receive processor 358, after which the signals are processed further at controller/processor 380. Controller/processor 380 provides the control of the various components of UE 120 and executes the software or other such logic stored in memory 382 that provides the features and functionality of UE 120. The combination of these components and acts may provide means for receiving, at a UE, an emergency notification.

At block 701, the UE discovers emergency multicast service acquisition information for one or more types of emergency content, wherein the discovering is in response to the emergency notification. Either operating through an independent emergency application stored onto the UE or an emergency application that is part of the middleware of the UE, the emergency notification prompts the UE to discover the information used to access the eMBMS emergency service broadcast for the multiple types of emergency content that may be available related to the emergency notification. For example, with reference to FIGS. 3 and 11, UE 1100 includes emergency application 1101, which when executed by a processor, such as controller/processor 380 of UE 120, may prepare the appropriate signaling to obtain the emergency multicast service acquisition information. UE 120, for example, would process these request signals and transmit the signals onto the network using transmit processor 364, TX MIMO processor 366, demodulator/modulators 354*a-r*, and antennas 352*a-r*, each under control of controller/processor 380. With reference to FIG. 6, the request signals from UE 602 may be received into the LTE system at eNB 604. Under control of MCE 606 and MME 608, the request is transmitted to MBMS-GW 616 and to BM-SC 612 to obtain the emergency multicast service acquisition information. This may include obtaining the TMGIs or other such indicators that identify the location of the eMBMS service. The combination of these components and acts may provide means for obtaining, by the UE, emergency multicast service acquisition information for one or more types of emergency content, wherein the discovering is in response to the emergency notification.

At block 702, the UE then tunes to the eMBMS service providing emergency content associated with the emergency notification, wherein the UE tunes to the eMBMS service using the emergency multicast service acquisition information. The indicators or TMGIs provide the information that the UE uses to tune specifically to the eMBMS emergency service. With reference to FIG. 3, using the identification information, UE 120, under control of controller/processor 380 uses receive processor 358, MIMO detector 356, and demodulator/modulators 354*a-r* to tune to the appropriate frequency and timing to access the eMBMS emergency service. Once tuned to the service, the UE may then receive the rich content and begin to present the content to the user. The combination of these components and acts may provide means for tuning, by the UE, to an eMBMS service providing emergency content associated with the emergency notification, wherein the UE tunes to the eMBMS service using the emergency multicast service acquisition information.

FIG. 7B is a functional block diagram illustrating example blocks executed to implement one aspect of the present disclosure. At block 703, a network broadcast entity receives emergency content from one or more emergency authorities. For purposes of this disclosure, a network broadcast entity may include any one or multiple network entities that are a part of the broadcast or MBMS system. For example, the network broadcast entity may comprise a CBC or CBE, such as CBC/CBE 902 of FIG. 9 or BM-SC 903. It may also be a combined unit of CBC/CBE 902 and BM-SC 903 and possibly another network entity, such as MBMS-GW 904 and the like. When an emergency event occurs or is detected, the emergency authority triggers the emergency alert system configured according to one aspect of the present disclosure and provides emergency content into the broadcast system to the network broadcast entity over a typical network interface connection. The initial content may be just a notification of more robust or rich emergency content to follow. However, some indication of the emergency content is received at the network broadcast entity. The combination of these components and acts may provide means for receiving, at a network broadcast entity, emergency content from an emergency authority.

At block 704, the network broadcast entity signals an emergency notification. In order to prompt the UE participating in the emergency system, an emergency notification is first sent that prompts the UE to discover services via the multicast service acquisition information. For example, when CBC/CBE 902 receives emergency content from the emergency authority, it sends an emergency notification to MME 906, which determines which locations are affected and then transmits the notifications to the appropriate location, such as RAN 901, for ultimate delivery to any UEs within the affected areas, such as UE 900. CBC/CBE 902 prepares the emergency notification or signals MME 906 or RAN 901 to prepare such emergency notification. The combination of these components and acts may provide means, executed in response to receiving the emergency content, for signaling, from the network broadcast entity, an emergency notification.

At block 705, the network broadcast entity broadcasts or sends emergency multicast service acquisition information associated with the emergency notification for one or more types of emergency content available related to the emergency notification. Service announcements or USD are maintained to have access information that allows a participating UE to access the eMBMS transmission or transmissions for each of the different types of emergency content that may be available related to the emergency notification. Such information may include temporary mobile group identifiers (TMGIs) or other such identifiers. A network broadcast entity, such as BM-SC 903 may generate and maintain the USD of the emergency service that includes the service announcement or TMGIs or other such accessibility information. The participating UEs may access and obtain this information by accessing BM-SC 903 or through knowledge of specially designated TMGIs or the like. The combination of these components and acts may provide means for providing, by the network broadcast entity, emergency multicast service acquisition information associated with the emergency notification for one or more types of emergency content available related to the emergency notification.

At block 706, the network broadcast entity transmits an eMBMS service with the one or more types of emergency content available related to the emergency notification, wherein the emergency multicast service acquisition information identifies the eMBMS service. The various different types of emergency content received by the cell broadcast center (CBC) from the emergency authority is provided to a broadcast server, such as BM-SC 903. Either BM-SC 903 or CBC/CBE 902 may trigger establishing one or more MBMS sessions. The MBMS sessions will then allow BM-SC 903 to transmit the emergency content through the eMBMS service over MBMS-GW 904. Using the appropriate acquisition information, a UE would be able to tune to the eMBMS service and process the various types of emergency content available related to the emergency notification. The combination of these components and acts may provide means for transmitting, by the network broadcast entity, an eMBMS with the one or more types of emergency content available related to the emergency notification, wherein the emergency multicast service acquisition information identifies the eMBMS.

In one aspect of the present disclosure, current procedures on SIBs designated for emergency services (for example, SIB10, 11, or 12) may be used to send notifications as defined for the UE to receive eMBMS service. These SIBs are already designated for the ETWS and CMAS services. Thus, infrastructure already exists for emergency handling between the governmental/emergency authorities and communication through the wireless communication networks. In one aspect, an implicit indication is used based on receiving a paging indication of ETWS and/or CMAS, or based on receiving one or more of the designated SIBs, SIB10/11/12. For example, a special message ID in SIB10, 11, or 12 may be used for such implicit indication. Alternatively, an explicit indication, such as a flag or control bit, may also be added in SIB10/11/12 to indicate or prompt the UE to enable eMBMS emergency services. Alternatively still, an explicit indication may also be added into SIB10/11/12 payload that provides additional information with regard to the eMBMS emergency services.

These various aspects of the present disclosure may define specially designated temporary mobile group identifiers (TMGIs) that are standardized, such that these specially designated TMGIs are known to carry the rich media contents of emergency alerts. Each UE would know these specially designated TMGIs are associated with emergency services, and when an emergency notification is received, these special TMGIs are used to tune to the appropriate eMBMS broadcast for the more detailed contents. Alternatively, in lieu of standardizing special TMGIs, non-specialized TMGIs associated with the emergency service may be indicated through a user service descriptor (USD). Thus, when the UE receives the emergency notification, it will obtain the necessary TMGIs through accessing the USD, whether the TMGIs are well-known standards or are non-specialized.

Once the UEs receive the emergency notification sent over the SIBs, the UE can tune to eMBMS to receive more detailed contents. The UEs tune to eMBMS by acquiring the TMGIs through the multicast control channel (MCCH) or SIB13 that correspond to the MBMS transport channel (MTCH) carrying the content. In order to accomplish these aspects of the present disclosure, changes may be needed to existing standards. Such changes may include defining specially designated TMGIs for emergency alerts or defining that such TMGIs associated with emergency service can be indicated through a USD. Additionally, changes to a UE's behavior upon receiving an emergency notification page or SIB10/11/12 may be defined along with updates to network architecture.

Figure 8:
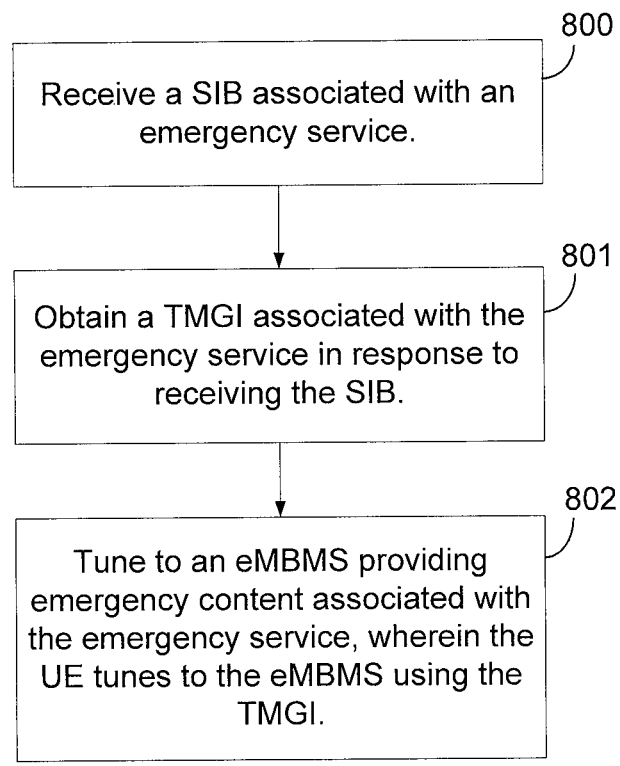
FIG. 8 is a functional block diagram illustrating example blocks executed to implement one aspect of the present disclosure.

FIG. 8 is a functional block diagram illustrating example blocks executed to implement one aspect of the present disclosure in which a UE receives notification of eMBMS emergency services through currently designated emergency SIBs. At block 800, a UE receives a SIB associated with an emergency service. The UE may receive a etws-indication or a cmas-indication via paging and read through SIB10 or 11 or SIB12 to obtain ETWS or CMAS notification on eMBMS. At block 801, the UE obtains a TMGI associated with the emergency service in response to receiving the SIB. The UE may obtain the corresponding TMGIs using various methods as previously described. For example, each of the known emergency types (e.g., ETWS, CMAS, and the like) may correspond to specially designated TMGIs that the UE will already know. Alternatively, the UE may perform service acquisition and registration procedures to obtain or access the USD to obtain the corresponding TMGIs. At block 802, the UE will then tune to an eMBMS providing emergency content associated with the emergency service, wherein the UE tunes to the eMBMS using the TMGI.

Figure 9:
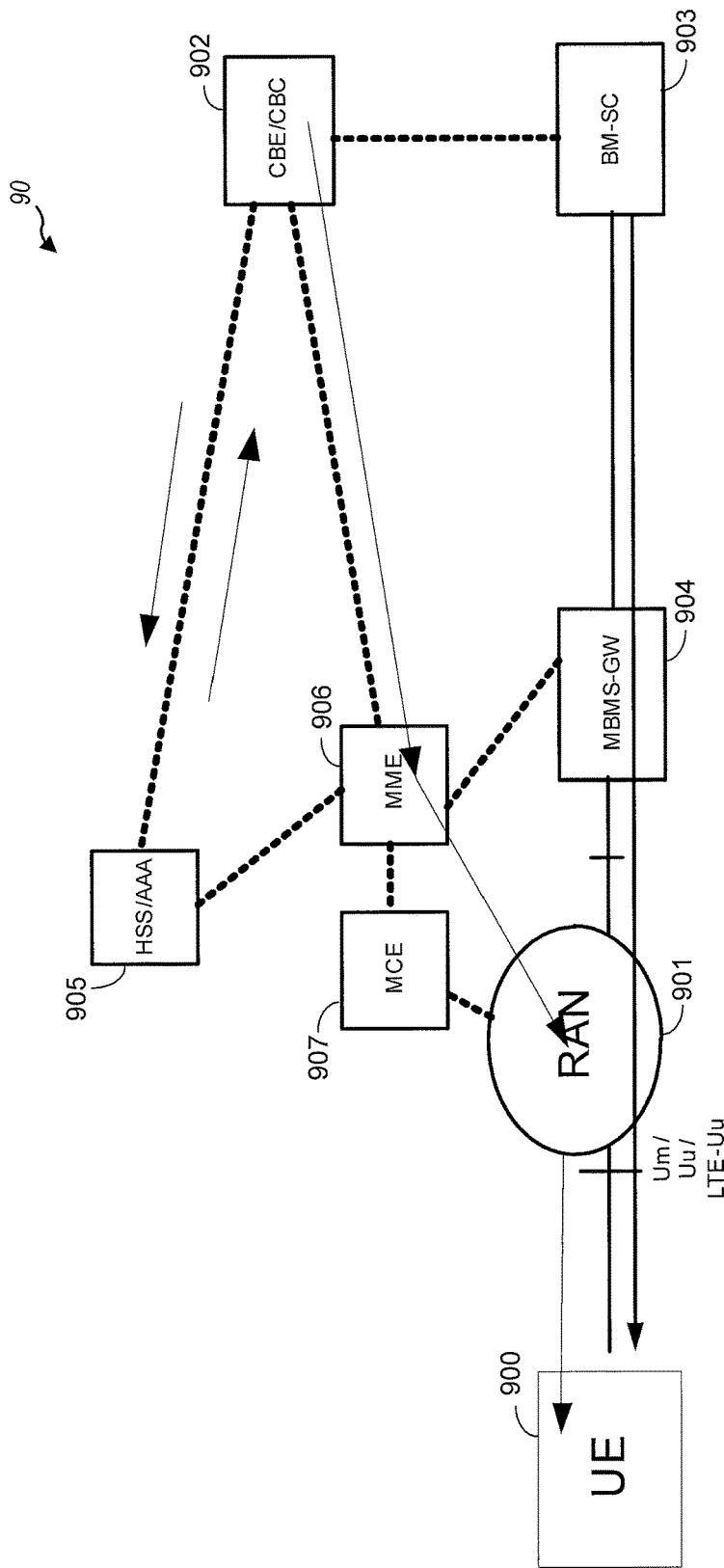
FIG. 9 is a block diagram illustrating an emergency broadcast system configured according to one aspect of the present disclosure.

FIG. 9 is a block diagram illustrating an emergency broadcast system 90 configured according to one aspect of the present disclosure. In managing a broadcast-multicast emergency service such as emergency broadcast system 90, an emergency authority (not shown) may initially establish a service and a mechanism to provide an emergency alert to the wireless network through cell broadcast entity (CBE)/cell broadcast center (CBC) 902. CBE/CBC 902 acts as the interface between the emergency authority and the wireless networks. In interfacing the broadcast-multicast emergency service to an LTE network, CBE/CBC 902 maintains a connection to mobility management entity (MME) 906. The MBMS system of the LTE network is managed by MME 906 with multicell/multicast coordinating entity (MCE) 907, BM-SC 903, and MBMS-GW 904.

When an emergency situation arises, CBE/CBC 902 issues an emergency notification and transmits the notification to MME 906. MME 906 determines the specific TAID/EAID that the emergency notification should be directed and selects the appropriate locations, such as RAN 901. RAN 901 may include various base stations and access nodes in a specific location corresponding to the TAID/EAID. An emergency notification is then transmitted which is received by UE 900. The emergency broadcast content is transmitted from BM-SC 903. An MBMS session may be established at BM-SC 903, which would also update the USD identifier for accessing the eMBMS emergency service session via normal operations & management (O&M) functionality. Alternatively, the eMBMS session may be triggered by CBE/CBC 902.

The emergency notification may be received as a SIB10/11/12, depending on the type of emergency. The emergency notification within the SIB10/11/12 then prompts UE 900 to obtain the corresponding TMGI. UE 900 may obtain the TMGI through various means, as previous noted, such as accessing the USD of the emergency service. The USD of the emergency service is maintained by BM-SC 903 and would be made available to UE 900 via RAN 901, MME 906, and MBMS-GW 904. Alternatively, UE 900 may already know specially designated TMGIs that correspond to the particular type of emergency based on receipt of the emergency notification through either of SIB10, 11, or 12. Using the appropriate TMGI, UE 900 tunes to access the eMBMS emergency service content transmitted by BM-SC 903 through MBMS-GW 904.

In alternative aspects as illustrated in FIG. 9, prior to an emergency eMBMS service being accessed by UE 900, UE 900 may be registered with the service. Subscriber information would be requested at CBE/CBC 902 from home subscriber server (HSS)/authentication, authorization, and accounting (AAA) server 905, which would respond with the available subscriber information including service area, eMBMS, and the like.

In another aspect of the present disclosure, the emergency notification is provided to a UE through a mechanism other than SIBs. As with previous aspects, the TMGIs identifying the bearers carrying the additional MBMS information may be specifically designated in the standards for emergency services or may be provided for discovery through the USD. If special TMGIs are defined, the UE may detect the emergency notification through a multicast control channel (MCCH) change notification signaling the presence of the reserved TMGI. The UE would acquire SIB13/MCCH to find out whether the special TMGIs are sent over eMBMS or not and then read the corresponding MTCH for emergency contents. If special TMGIs are not defined, changes to the standards may provide for an MBMS emergency indication to be added in a page message, and the eMBMS emergency indication will prompt the UE to read related MCCH and MTCH without resorting to any SIB. Because this aspect does not rely on the particular emergency SIBs tied to ETWS and CMAS emergency services, it may be used for delivery of other emergency services in addition to ETWS and CMAS services.

Figure 10:
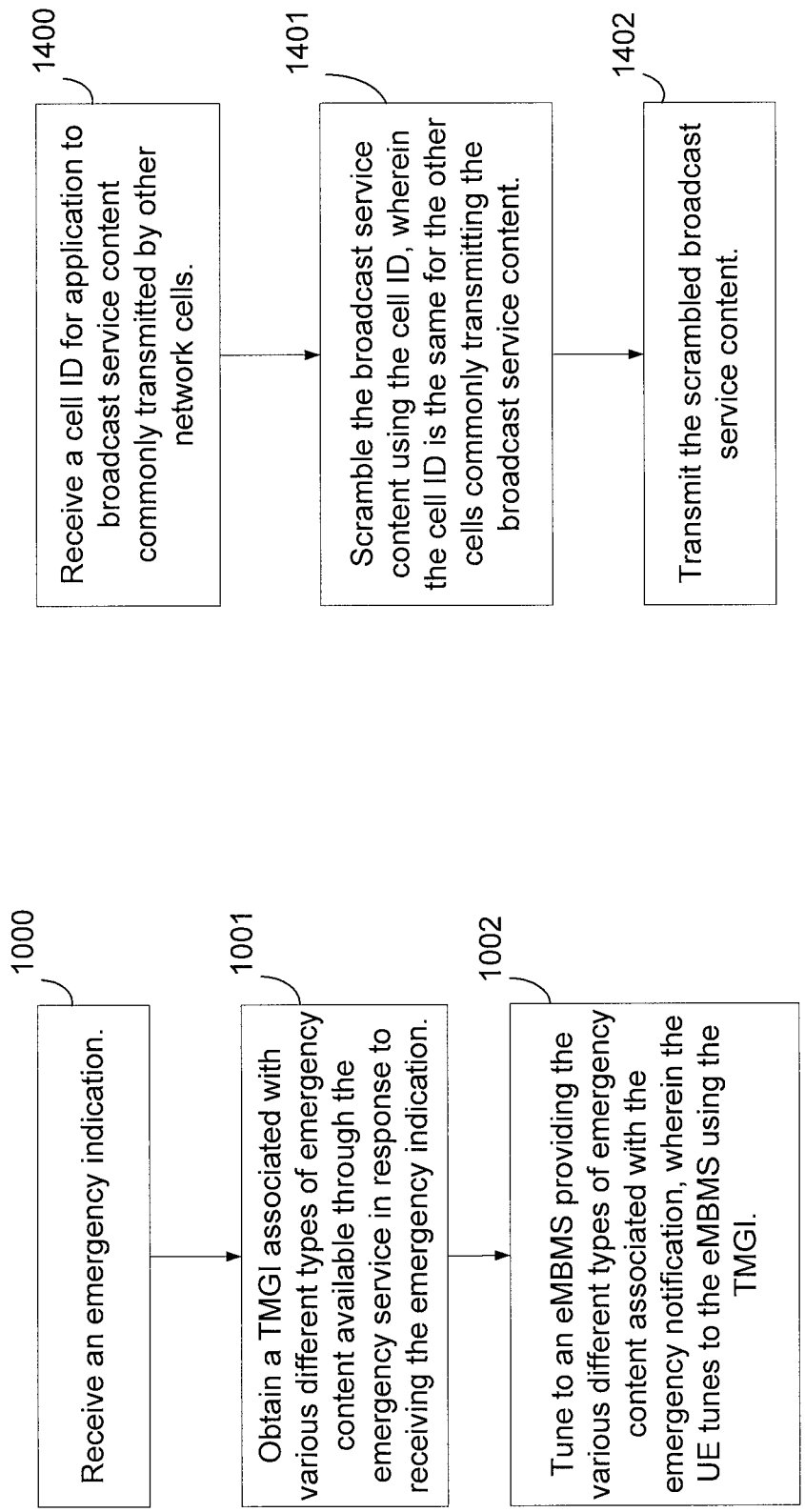
FIG. 10 is a functional block diagram illustrating example blocks executed to implement one aspect of the present disclosure.

FIG. 10 is a functional block diagram illustrating example blocks executed to implement one aspect of the present disclosure. At block 1000, a UE receives an emergency indication. As noted, the emergency indication of the presently described aspect may be a number of various notifications. For example, an MCCH change notification may be received over the PDCCH, or a special MBMS emergency indication may be defined for a page message. At block 1001, the UE would obtain a TMGI associated with various different types of emergency content available through the emergency service in response to receiving the emergency indication. The UE would access the USD to obtain the corresponding TMGIs or, if a specially designated TMGI is known, the UE may directly acquire the MCCH to find out whether the TMGI are sent over eMBMS. At block 1002, the UE would then tune to an eMBMS providing the various different types of emergency content associated with the emergency notification, wherein the UE tunes to the eMBMS using the TMGI.

Figure 11:
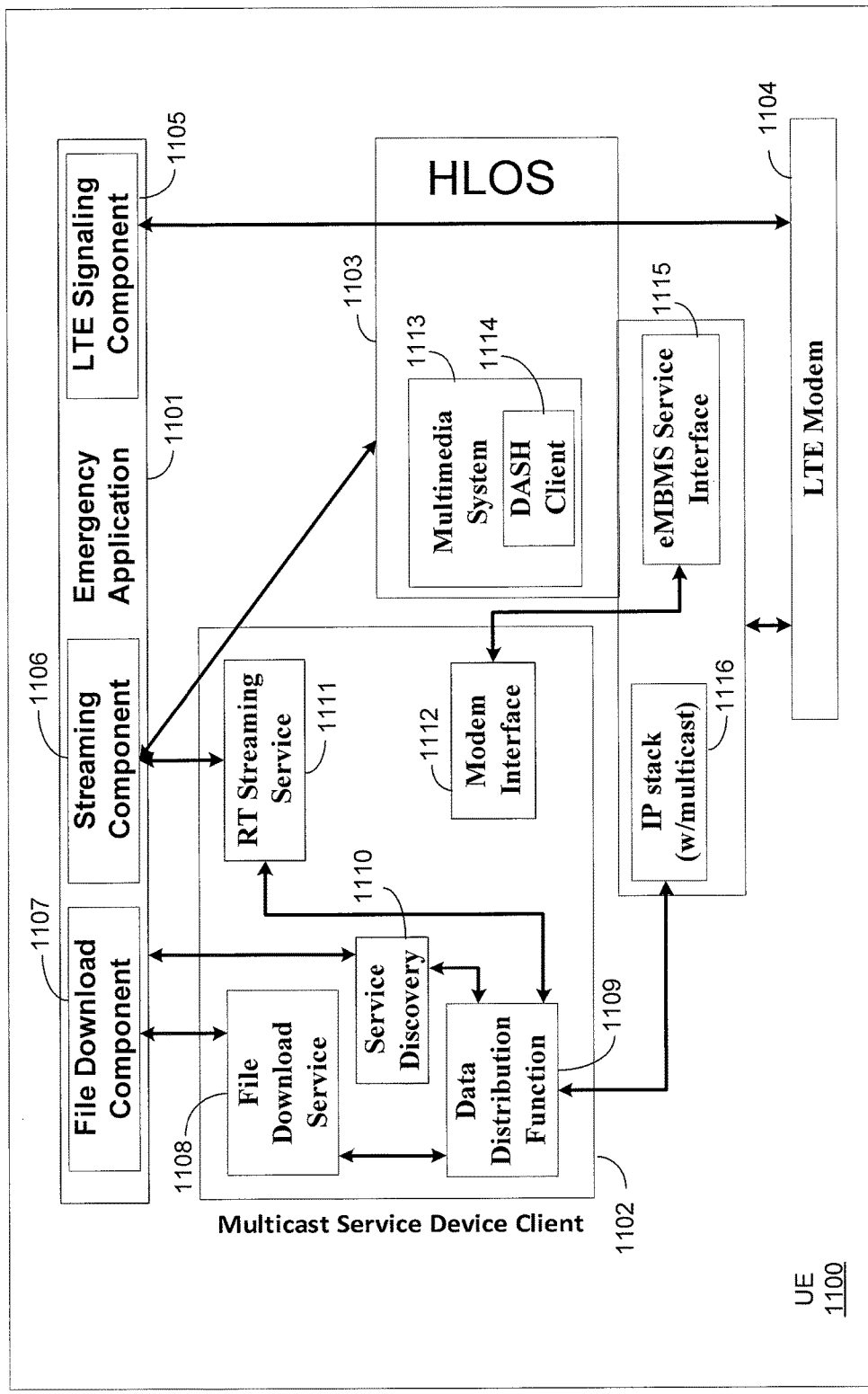
FIG. 11 is a block diagram illustrating a UE configured according to one aspect of the present disclosure.

On the UE side, an emergency application may be implemented that discovers emergency services through the USD. FIG. 11 is a block diagram illustrating a UE 1100 configured according to one aspect of the present disclosure. UE 1100 includes emergency application 1101, which is configured to manage the eMBMS emergency service content for presentation to a user. Emergency application 1101 includes multiple components, including LTE signaling component 1105, which may receive LTE signaling information from LTE modem 1104, streaming component 1106, which provides processing for incoming emergency streaming content from the eMBMS emergency service, and file download component 1107, which provide processing for incoming files transmitted from the eMBMS emergency service. LTE modem 1104 would expose emergency SIB information that would be processed by emergency application 1101. In order to save power at the UE, emergency application 1101 may remain deactivated until an emergency SIB is received at LTE modem 1104. When LTE modem 1104 receives the emergency SIB, it may trigger emergency application 1101 to activate in order to process the received emergency SIB. Emergency application 1101 is able to become eMBMS-aware by registering for eMBMS services to receive the file content, whether the file content is a file download or streaming content. By accessing streaming file content, emergency application 1101 would initiate streaming services through streaming component 1106 for streaming the emergency content received through the DASH client 1114 of multimedia system 1113 of the high level operating system (HLOS) 1103 of UE 1100, or through real-time streaming service 1111 of the middleware layer of multicast service device client (MSDC) 1102 of UE 1100. This implementation approach leverages a framework where this eMBMS middleware layer, of MSDC 1102 abstracts the details of eMBMS transport from emergency application 1101. This abstraction layer allows emergency application 1101 to continue handling the SIB-based behavior on emergency notification. Emergency application 1101 offers additional eMBMS services as a broadcast application would typically offer by providing user interfaces to access file content, through file download component 1107, or play streaming content, through streaming component 1106.

The abstraction layer provided through MSDC 1102 allows emergency application 1101 to handle the emergency content and initiation, while the mechanics of establishing access to the eMBMS emergency service content is handled by MSDC 1102. MSDC 1102 interacts with the HLOS 1103 of UE 1100 to interact with the LTE modem 1104 for providing communication to and from the eMBMS emergency service framework. Service discovery 1110 may communicate through modem interface 1112 to eMBMS service interface 1115 of HLOS 1103 to access and register for the emergency services. Once data begins to be received at UE 1100, HLOS 1103 handles the data through IP stack with multicast 1116 passing the data to data distribution function 1109 of MSDC 1102. Data distribution function 1109 may then distribute file download data to file download service 1108, which then interacts with emergency application 1101 through file download component 1107. Additional data associated with service acquisition may be provided from data distribution function 1109 to service discovery 110, which may also provide appropriate data to emergency application 1101 through file download component 1107. Streaming media content received from the eMBMS emergency service is provided from data distribution function 1109 to real-time streaming service 1111, which provides the streaming data to emergency application 1101 through streaming component 1106. Streaming component 1106 will interact with the input/output (I/O) components (not shown) of UE 1100 to display the streaming content. Streaming content may also be provided to emergency application 1101 directly from the HLOS 1103 through multimedia system 1113.

It should be noted that while emergency application 1101 is shown as a separate, self-contained application, emergency handling aspects of emergency application 1101 on the UE may also be part of the eMBMS middleware or MSDC 1102 or may be divided between emergency application 1101 with part of the functionality in MSDC 1102.

Figure 12:
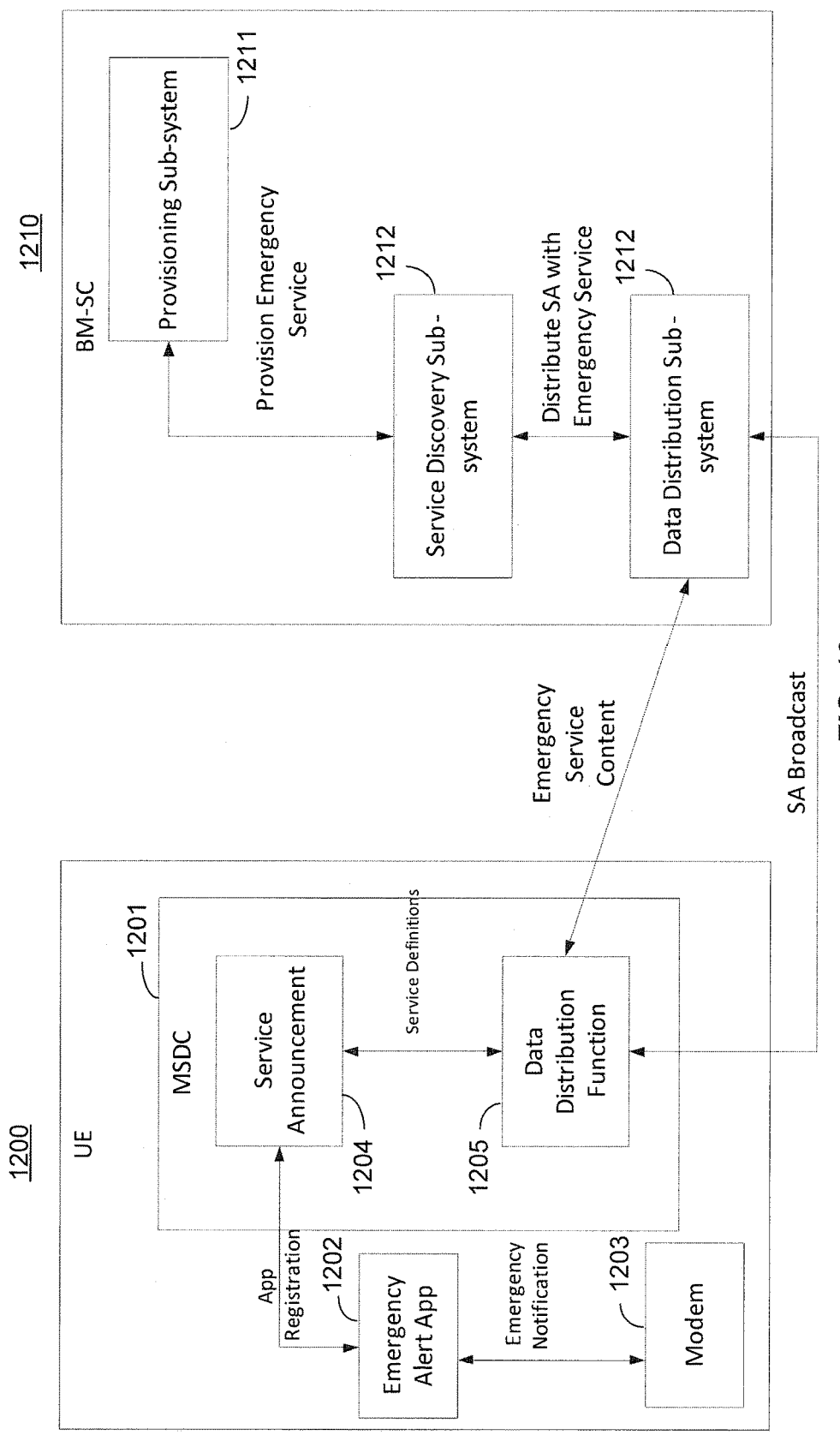
FIG. 12 is a block diagram illustrating a UE configured according to one aspect of the present disclosure.

FIG. 12 is a block diagram illustrating a UE 1200 configured according to one aspect of the present disclosure. UE 1200 includes emergency alert application 1202 and MSDC 1201 to abstract the details of eMBMS transport from emergency alert application 1202. Modem 1203 provides communication access to BM-SC 1210, which is a part of the wireless network. BM-SC 1210 provides the eMBMS emergency service content that will be accessed in the event of an emergency. When an emergency occurs, BM-SC 1210 provisions the emergency service at provisioning sub-system 1211. Provisioning sub-system prepares the emergency notifications as well as prepares the emergency content that will be provided through the eMBMS. Service discovery sub-system 1212 adds the service announcement to the emergency services alert. The service announcement will allow any receiving UE to understand how to access and register with the eMBMS emergency service to receive the content. BM-SC 1210 transmits the emergency notification with the service announcement. If multiple frequency bands are supported for eMBMS services, a service announcement with an emergency services definition should be broadcast to all frequency bands.

Because it is located in an appropriate TAID/EAID, UE 1200 receives the emergency notification with the service announcement. Modem 1203 passes the emergency notification directly to emergency alert application 1202 and passes the service announcement to MSDC 1201. Data distribution function 1205 of MSDC 1201 passes the service announcement to service announcement 1204 for processing. Upon receiving the emergency notification, emergency alert application 1202 communicates with MSDC 1201 to initiate application registration to the eMBMS emergency service. Using the service announcement from BM-SC 1210, service announcement 1204 processes the service class and other identifying information to register UE 1200 for the eMBMS emergency service distributed by BM-SC 1210. Registration includes access to the USD of the emergency service, which provides UE 1200 the appropriate TMGIs for tuning to the emergency service content transmitted from BM-SC 1210. MSDC 1201 receives the emergency service content through modem 1203 and provides the content to emergency alert application 1202 for presentation to the user.

Various issues may arise with respect to implementation of the eMBMS service as described through the illustrations of FIG. 12. The emergency application, such as emergency alert application 1202 should know its service class information. As illustrated in FIG. 12, BM-SC 1210 defines and announces emergency services as any other services. BM-SC 1210 may also update the USD with a new schedule when emergency is signaled. Emergency alert application 1202 registers, as described, with MSDC 1201 once it receives emergency notification, which ensures that MSDC 1201 is up to process emergency services. MSDC 1201 provides a registered emergency application, such as emergency alert application 1202, with list of available services and may monitor USD changes more frequently in an emergency mode. MSDC 1201 activates streaming and file delivery reception in response to requests from the emergency alert application 1202.

According to various aspects of the present disclosure, many different methods may be employed to provide emergency service class notification to participating UEs. For example, in one aspect of the present disclosure an emergency application is pre-configured with its service class like any other application. This is a variation of an aspect where no additional signaling is needed in existing SIBs (e.g., SIB10/11/12) to provide an emergency service class notification. The application then uses its service class to discover the available emergency services described in the USD and provided to the emergency application by the middleware layer (e.g., the MSDC).

According to another aspect of the present disclosure, the broadcast service class of an eMBMS emergency service is included in SIB10/11 (for ETWS) and in SIB12 (for CMAS). The service class would be encoded as part of the warning message segments in the SIBs. This may be useful if the same emergency application needs to operate on different carrier networks. This variation signals the availability of broadcast services in the existing SIBs by describing which service class to consider as a part of the emergency alert message.

According to another aspect of the present disclosure, a new message type is defined in the existing SIB configurations. The new message type carries the service class in the message segment. In this additional aspect, an explicit element is included in the message of the existing SIBs that identifies the service class announcement.

According to another aspect of the present disclosure, the SIB message structure is extended to incorporate a service class announcement. In this additional aspect, the existing SIBs structure may be expanded through an extension that defines the service class of the emergency service.

According to another aspect of the present disclosure, a new SIB may be defined which incorporates the service class announcement and any other information that might be necessary or useful in providing an eMBMS emergency service. When a new SIB is defined for eMBMS emergency services, similar to the etws-indication and/or cmas-indication defined in paging, a new indication in paging may be added to signal the change on the new SIB.

Figure 13:
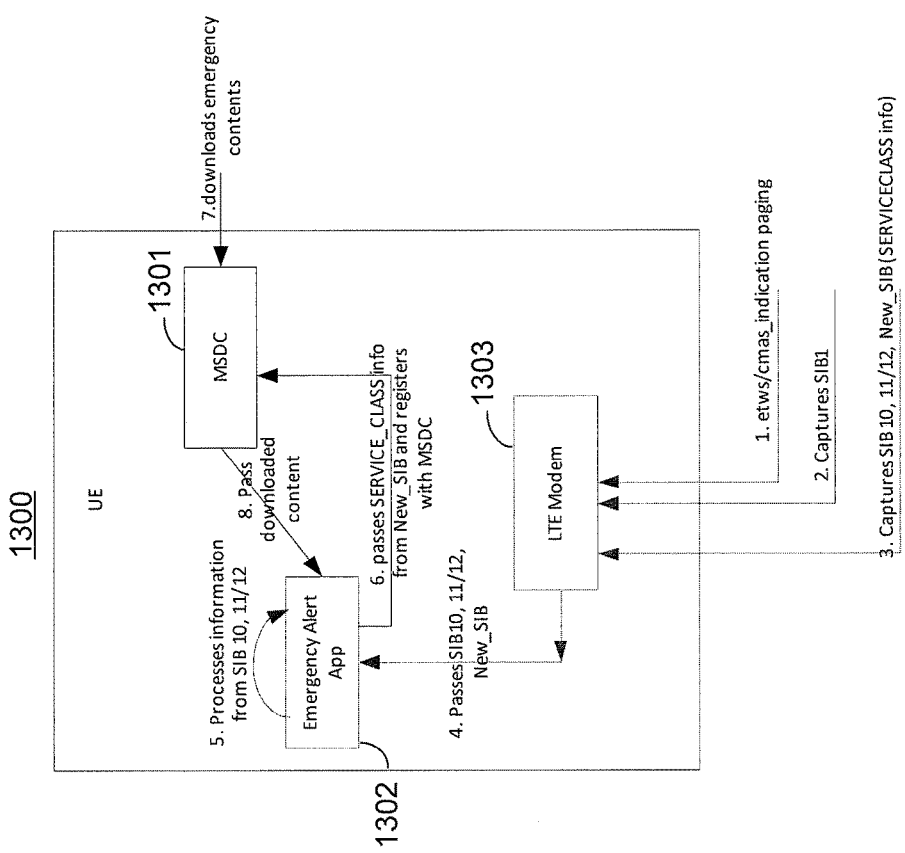
FIG. 13 is a block diagram illustrating a UE configured according to one aspect of the present disclosure.

A new SIB carrying service class information of eMBMS emergency services may be provided to accommodate one or multiple emergency services. If multiple emergency services happen to be present, the new SIB will list all the service classes in as separate segmented content. FIG. 13 is a block diagram illustrating a UE 1300 configured according to one aspect of the present disclosure. UE 1300 includes MSDC 1301 that provides an abstraction layer, abstracting the eMBMS transport processes from emergency alert application 1302. LTE modem 1303 provides access to the LTE wireless network to communicate with the emergency services offered over the eMBMS broadcast-multicast system.

LTE modem 1303 captures various signaling, including ETWS/CMAS indication paging, SIB1, which is typically sent periodically (e.g., every 80 ms or the like) and provides schedule information for SIB10/11/12, and capturing the SIBs, SIB10/11/12 and the newly defined SIB, New_SIB. LTE modem 1303 passes the SIBs, including New_SIB to emergency alert application 1302. Emergency alert application 1302 processes the information from SIB10/11/12. Emergency alert application 1302 reads the service class information from New_SIB and passes the service class information while registering with MSDC 1301. MSDC 1301 may use the service class to identify the particular emergency services available. MSDC 1301 accesses the appropriate emergency services based on the service class received from the New_SIB. Emergency content is downloaded and passed for processing and presentation to a user by emergency alert application 1302.

The various aspects of the present disclosure according to the aspect illustrated in FIG. 13, may provide a new SIB that can potentially include various pieces of information that can be transmitted to a UE and/or emergency application via the new SIB. For example, as previously described, the new SIB may include service class data, but may also include FLUTE and TMGI information (basically providing session description) of the emergency service carrying additional emergency information. The new SIB may even carry emergency services descriptions (e.g., USD) and act as service announcement for eMBMS emergency services.

Additional aspects of the present invention may provide means and mechanisms to improve the performance of the described eMBMS emergency services and existing unicast systems as well. The operating SNR of SIBs can be improved for the same content of SIBs. Because, in a situation where the SIBs will be transmitting the same content, cell interference from other cells may be reduced when all cells can transmit same contents scrambled with same ID. For example, all cells broadcasting ETWS/CMAS emergency content may use the same physical cell ID (PCI). ETWS/CMAS can, thus, be scrambled with the same cell ID. The system information (SI)—radio network temporary ID (RNTI) is already the same across all cells. Thus, the system may use the same time and frequency scheduling for ETWS/CMAS transmissions. This may be accomplished either via dynamic scheduling (PDCCH) or fixed scheduling, such as through predefined time and frequency resources. Due to the reference signal (RS) pattern associated with unicast transmission, the effective MBSFN area is smaller compared to eMBMS; however, it allows a UE that does not support MBMS transmissions to receive ETWS/CMAS with rich media text as well or the coverage for ETWS/CMAS may be further improved. Such a new system of using the same cell ID for all cells broadcasting the same information may benefit from standards changes. For example, an interface from CBC/CBE to BM-SC may be useful in such application.

This system may also apply to a new SIB which carries system time or defined for the eMBMS emergency services. A SIB carrying system time may work, as all cells within an MBSFN area will be synchronized and, thus, have the same system time. Similarly, all cells have the same contents for the new SIB defined for eMBMS emergency services. In such systems, a virtual cell ID can be signaled for the new SIB instead of using the same PCI for all cells, and this same virtual ID will be used by all such signaled cells in order to gain the benefits of increased SNR.

FIG. 14 is a functional block diagram illustrating example blocks executed to implement one aspect of the present disclosure. At block 1400, a cell receives a cell ID for application to broadcast service content commonly transmitted by other network cells. The cell may receive the designated cell ID from the MME when implementing an interface and managing an eMBMS emergency service or other such transmission, such as a unicast emergency service implemented though SIBs, such as SIB10/11 (ETWS) and SIB12 (CMAS). At block 1401, the cell scramble the broadcast service content using the cell ID, wherein the cell ID is the same for the other cells commonly transmitting the broadcast service content. With each cell transmitting the same information scrambling using the same cell ID, the SNR will be improved for improved reception and reduced requests for reacquisition from participating UEs. At block 1402, the cell then transmits the scrambled broadcast service content.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and process steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
  receiving, at a user equipment (UE), an emergency notification indicating that emergency content associated with the emergency notification is available over an evolved multimedia broadcast-multicast service (eMBMS), wherein the emergency notification is received via a system information block (SIB) message that includes the emergency notification;
  requesting, by the UE, in response to receiving the emergency notification via the SIB message, multicast service acquisition information, wherein the multicast service acquisition information includes at least a group identifier including an identification of the eMBMS providing the emergency content associated with the emergency notification;
  receiving, by the UE, the multicast service acquisition information that includes at least the group identifier;
  obtaining, by the UE, from the group identifier, the identification of the eMBMS providing the emergency content associated with the emergency notification, wherein the group identifier is a temporal mobile group identifier (TMGI) identifying the eMBMS providing the emergency content; and
  tuning, by the UE, to the eMBMS providing the emergency content, wherein the UE tunes to the eMBMS using the identification of the eMBMS obtained from the group identifier.

2. The method of claim 1, wherein the obtaining comprises:
  accessing a pre-configured service class associated with the emergency notification; and
  using the pre-configured service class in the obtaining the identification of the eMBMS.

3. The method of claim 1, further comprising:
  decoding a service class encoded into the SIB message, wherein the service class is associated with the emergency notification; and
  using the decoded service class in the obtaining the identification of the eMBMS.

4. The method of claim 1, further comprising:
  reading a service class included in the SIB message, wherein the service class is associated with the emergency notification; and
  using the service class in the obtaining the identification of the eMBMS.

5. The method of claim 1, further comprising:
  reading a service class message structure in an extension included in the SIB message;
  obtaining a service class included in the SIB message based on the service class message structure, wherein the service class is associated with the emergency notification; and
  using the service class in the obtaining the identification of the eMBMS.

6. The method of claim 1, wherein the SIB message includes
  a service class, wherein the service class is associated with the emergency notification, and further comprising:
  using the service class in the obtaining the identification of the eMBMS.

7. An apparatus configured for wireless communication, comprising:
  means for receiving, at a user equipment (UE), an emergency notification indicating that emergency content associated with the emergency notification is available over an evolved multimedia broadcast-multicast service (eMBMS), wherein the emergency notification is received via a system information block (SIB) message that includes the emergency notification;
  means for requesting, by the UE, in response to receiving the emergency notification via the SIB message, multicast service acquisition information, wherein the multicast service acquisition information includes at least a group identifier including an identification of the eMBMS providing the emergency content associated with the emergency notification;
  means for receiving, by the UE, the multicast service acquisition information that includes at least the group identifier;
  means for obtaining, by the UE, from the group identifier, the identification of the eMBMS providing the emergency content associated with the emergency notification, wherein the group identifier is a temporal mobile group identifier (TMGI) identifying the eMBMS providing emergency content; and
  means for tuning, by the UE, to the eMBMS providing the emergency content, wherein the UE tunes to the eMBMS using the identification of the eMBMS obtained from the group identifier.

8. The apparatus of claim 7, wherein the means for obtaining comprises:
  means for accessing a pre-configured service class associated with the emergency notification; and
  means for using the pre-configured service class in the means for obtaining the identification of the eMBMS.

9. The apparatus of claim 7, further comprising:
  means for decoding a service class encoded into the SIB message, wherein the service class is associated with the emergency notification; and
  means for using the decoded service class in the means for obtaining the identification of the eMBMS.

10. The apparatus of claim 7, further comprising:
  means for reading a service class included in the SIB message, wherein the service class is associated with the emergency notification; and
  means for using the service class in the means for obtaining the identification of the eMBMS.

11. The apparatus of claim 7, further comprising:
  means for reading a service class message structure in an extension included in the SIB message;
  means for obtaining a service class included in the SIB message based on the service class message structure, wherein the service class is associated with the emergency notification; and
  means for using the service class in the means for obtaining the identification of the eMBMS.

12. The apparatus of claim 7, wherein the SIB message includes a service class, wherein the service class is associated with the emergency notification, and further comprising:
    means for using the service class in the means for obtaining the identification of the eMBMS.

13. A non-transitory computer-readable medium having program code stored thereon, wherein the program code, when executed by a computer, causes the computer to:
    receive, at a user equipment (UE), an emergency notification indicating that emergency content associated with the emergency notification is available over an evolved multimedia broadcast-multicast service (eMBMS), wherein the emergency notification is received via a system information block (SIB) message that includes the emergency notification;
    request, by the UE, in response to the reception of the emergency notification via the SIB message, multicast service acquisition information, wherein the multicast service acquisition information includes at least a group identifier including an identification of the eMBMS providing the emergency content associated with the emergency notification;
    receive, by the UE, the multicast service acquisition information that includes at least the group identifier;
    obtain, by the UE, from the group identifier, the identification of the eMBMS providing the emergency content associated with the emergency notification, wherein the group identifier is a temporal mobile group identifier (TMGI) identifying the eMBMS providing the emergency content; and
    tune, by the UE, to the eMBMS providing the emergency content, wherein the UE tunes to the eMBMS using the identification of the eMBMS obtained from the group identifier.

14. The non-transitory computer-readable medium of claim 13, wherein the program code that causes the computer to obtain comprises program code that causes the computer to:
    access a pre-configured service class associated with the emergency notification; and
    use the pre-configured service class in the program code that causes the computer to obtain the identification of the eMBMS.

15. The non-transitory computer-readable medium of claim 13, further comprising program code that causes the computer to:
    decode a service class encoded into the SIB message, wherein the service class is associated with the emergency notification; and
    use the decoded service class in the program code that causes the computer to obtain the identification of the eMBMS.

16. The non-transitory computer-readable medium of claim 13, further comprising program code that causes the computer to:
    read a service class included in the SIB message, wherein the service class is associated with the emergency notification; and
    use the service class in the program code that causes the computer to obtain the identification of the eMBMS.

17. The non-transitory computer-readable medium of claim 13, further comprising program code that causes the computer to:
    read a service class message structure in an extension included in the SIB message;
    obtain a service class included in the SIB message based on the service class message structure, wherein the service class is associated with the emergency notification; and
    use the service class in the program code that causes the computer to obtain the identification of the eMBMS.

18. The non-transitory computer-readable medium of claim 13, wherein the SIB message includes
    a service class, wherein the service class is associated with the emergency notification, and further comprising program code that causes the computer to:
    use the service class to obtain the identification of the eMBMS.

19. An apparatus configured for wireless communication, comprising:
    at least one processor; and
    a memory coupled to the at least one processor, wherein the at least one processor is configured to:
        receive, at a user equipment (UE), an emergency notification indicating that emergency content associated with the emergency notification is available over an evolved multimedia broadcast-multicast service (eMBMS), wherein the emergency notification is received via a system information block (SIB) message that includes the emergency notification;
        request, by the UE, in response to the reception of the emergency notification via the SIB message, multicast service acquisition information, wherein the multicast service acquisition information includes at least a group identifier including an identification of the eMBMS providing the emergency content associated with the emergency notification;
        receive, by the UE, the multicast service acquisition information that includes at least the group identifier;
        obtain, by the UE, from the group identifier, the identification of the eMBMS providing the emergency content associated with the emergency notification, wherein the group identifier is a temporal mobile group identifier (TMGI) identifying the eMBMS providing the emergency content; and
        tune, by the UE, to the eMBMS providing the emergency content, wherein the UE tunes to the eMBMS using the identification of the eMBMS obtained from the group identifier.

20. The apparatus of claim 19, wherein the configuration of the at least one processor to discover comprises configuration of the at least one processor:
    access a pre-configured service class associated with the emergency notification; and
    use the pre-configured service class in the configuration of the at least one processor to obtain the identification of the eMBMS.

21. The apparatus of claim 19, further comprising configuration of the at least one processor to:
    decode a service class encoded into the SIB message, wherein the service class is associated with the emergency notification; and
    use the decoded service class in the configuration of the at least one processor to obtain the identification of the eMBMS.

22. The apparatus of claim 19, further comprising configuration of the at least one processor to:
    read a service class included in the SIB message, wherein the service class is associated with the emergency notification; and
    use the service class in the configuration of the at least one processor to obtain the identification of the eMBMS.

23. The apparatus of claim 19, further comprising configuration of the at least one processor to:
- read a service class message structure in an extension included in the SIB message;
- obtain a service class included in the SIB message based on the service class message structure, wherein the service class is associated with the emergency notification; and
- use the service class in the configuration of the at least one processor to obtain the identification of the eMBMS.

24. The apparatus of claim 19, wherein the SIB message includes
- a service class, wherein the service class is associated with the emergency notification, and further comprising configuration of the at least one processor to:
- use the service class in the configuration of the at least one processor to obtain the identification of the eMBMS.

* * * * *